US008284406B2

(12) United States Patent
Nakata et al.

(10) Patent No.: US 8,284,406 B2
(45) Date of Patent: Oct. 9, 2012

(54) DISPLACEMENT MEASUREMENT METHOD AND APPARATUS THEREOF, STAGE APPARATUS, AND PROBE MICROSCOPE

(75) Inventors: Toshihiko Nakata, Yokohama (JP); Masahiro Watanabe, Yokohama (JP); Shuichi Baba, Yokohama (JP); Mineo Nomoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 839 days.

(21) Appl. No.: 12/063,860

(22) PCT Filed: Aug. 9, 2006

(86) PCT No.: PCT/JP2006/315758
§ 371 (c)(1),
(2), (4) Date: Apr. 23, 2009

(87) PCT Pub. No.: WO2007/020856
PCT Pub. Date: Feb. 22, 2007

(65) Prior Publication Data
US 2009/0210971 A1  Aug. 20, 2009

(30) Foreign Application Priority Data
Aug. 17, 2005 (JP) .................... 2005-236292

(51) Int. Cl.
*G01B 9/02* (2006.01)
(52) U.S. Cl. .......... 356/496; 356/493; 356/498; 356/487
(58) Field of Classification Search .................. None
See application file for complete search history.

(56) References Cited

U.S. PATENT DOCUMENTS
5,748,317 A * 5/1998 Maris et al. .................... 356/502
5,748,318 A * 5/1998 Maris et al. .................... 356/630
5,959,735 A * 9/1999 Maris et al. .................... 356/632
(Continued)

FOREIGN PATENT DOCUMENTS
JP        61-145476        7/1986
(Continued)

OTHER PUBLICATIONS

F. Demarest, "High-resolution, high-speed, low-data age uncertainty, heterodyne displacement measuring interferometer electronics", Meas. Sci. Technol., 9 (1998), 1024-1030.

*Primary Examiner* — David A Vanore
*Assistant Examiner* — Andrew Smyth
(74) *Attorney, Agent, or Firm* — Antonelli, Terry, Stout & Kraus, LLP.

(57) ABSTRACT

The present invention provides a displacement measurement method, an apparatus thereof, a probe microscope. which make it possible to stably measure an amount of displacement and a moving distance of an object under measurement with an accuracy of the sub-nanometer order or below without being affected by disturbances such as fluctuations of air, mechanical vibration.
Specifically, with the present invention, a pulsed beam is split into two; one beam is reflected by an object under measurement and then inputted to a delay optical path equivalent to one pulse period; and the other beam is sent through the same delay optical path in the opposite direction up to the object under measurement with a delay of one pulse period, and then reflected by the object under measurement. Then, an optical phase variation caused by the movement of the object under measurement is obtained by subjecting the two pulsed beams to interference.

18 Claims, 11 Drawing Sheets

U.S. PATENT DOCUMENTS

| | | | |
|---|---|---|---|
| 6,175,416 B1 * | 1/2001 | Maris et al. | 356/630 |
| 6,208,421 B1 * | 3/2001 | Maris et al. | 356/432 |
| 6,208,424 B1 * | 3/2001 | de Groot | 356/500 |
| 6,252,222 B1 * | 6/2001 | Kasapi et al. | 250/214 R |
| 6,271,921 B1 * | 8/2001 | Maris et al. | 356/432 |
| 6,400,449 B2 * | 6/2002 | Maris et al. | 356/72 |
| 6,577,400 B1 * | 6/2003 | Klaver | 356/477 |
| 2001/0028460 A1 * | 10/2001 | Maris et al. | 356/432 |
| 2006/0033924 A1 * | 2/2006 | Hill | 356/450 |

FOREIGN PATENT DOCUMENTS

| | | |
|---|---|---|
| JP | 61145476 A * | 7/1986 |
| JP | 09-211128 | 8/1997 |
| JP | 09211128 A * | 8/1997 |

* cited by examiner

_US 8,284,406 B2_

DISPLACEMENT MEASUREMENT METHOD AND APPARATUS THEREOF, STAGE APPARATUS, AND PROBE MICROSCOPE

TECHNICAL FIELD

The present invention relates to a method for measuring a displacement of an object under measurement by use of optical interference. More particularly, the present invention relates to a displacement measurement method and an apparatus thereof, wherein the object under measurement is irradiated with laser beam, a beam reflected therefrom is subjected to interference with a reference beam, and the amount of displacement of the object under measurement is measured from an obtained interference signal. Further, the present invention relates to a stage apparatus and a probe microscope.

BACKGROUND ART

A method using optical interference is widely known as a method for measuring the amount of displacement or moving distance of an object under measurement (Meas. Sci. Technol., 9 (1998), 1024-1030). An example of the method is shown in FIG. 12. With an interferometer shown in FIG. 12, two-frequency orthogonally polarized beams 302, of which polarizations are orthogonal each other and the difference of the optical frequency between the two beams is 20 MHz, is emitted from a laser head 301. The polarized beam is split into two polarization components by a polarizing beam splitter 303. An S-polarized beam 304 reflects off a polarization beam splitter 303 and then a rectangular prism 305, then enters the polarizing beam splitter 303 as a reference beam. A P-polarized beam 306 passes through the polarizing beam splitter 303, reflects off a rectangular prism 307 arranged on an object under measurement 400, and then enters the polarizing beam splitter 303. Both reflected beams are combined by the polarizing beam splitter 303. The combined beam passes through a polarizing plate 308 having a polarization angle of 45 degrees with respect to the polarization directions of both reflected beams, and then is subjected to heterodyne interference. The heterodyne interference light is received by a photoelectric transducer 309 and then converted to an electrical signal 310. A frequency $f_M$ of the heterodyne interference signal 310 is given by Formula (1) with the addition of the Doppler shift frequency in relation to a moving velocity V of the object under measurement 400.

$$f_M = f_B \pm NV/\lambda \quad (1)$$

where $f_B$=20 MHz and $\lambda$ is a wavelength of the laser beam. Further, N (=2, 4, . . . ) is a constant determined by the number of round-trip propagations through the optical path. In FIG. 12, N=2. On the other hand, a beat signal 311 having a frequency ($f_B$) of 20 MHz is outputted from the laser head 301 as a reference signal. A measured heterodyne interference signal 310 and the reference signal 311 are inputted to a phase detector 312. A moving velocity V and a moving distance 400d of the object under measurement 400 are obtained from the phase difference between both signals and outputted as a moving distance output signal 313.

Nonpatent Reference 1: Meas. Sci. Technol., 9 (1998), 1024-1030

DISCLOSURE OF THE INVENTION

Problem to be Solved by the Invention

With the interferometer shown in FIG. 12, a probe optical path, i.e., an optical path on which the P-polarized beam 306 (probe beam) travels is spatially separated from a reference optical path on which the S-polarized beam 304 (reference beam) travels. Therefore, if temperature distribution or refraction index distribution due to fluctuations of air, or mechanical vibration occurs in either optical path, an optical path difference between both optical paths may be fluctuated resulting in a measurement error of the nanometer order. With probe position measurement and control of a photolithography machine for semiconductor micropattern manufacture applicable to future 45 nm- or 32 nm-node, a stage for a pattern critical-dimension measurement apparatus, and a probe microscope used for localized critical-dimension measurement and characterization, a positioning accuracy of the sub-nanometer order is demanded. The conventional technique shown in FIG. 12 cannot meet the demand. Although a method for controlling the temperature, humidity, mechanical vibration, and other environmental factors with a high accuracy is also assumed, the economical effects will be remarkably degraded in terms of apparatus cost, apparatus size, and usability.

An object of the present invention is to provide a displacement measurement method and an apparatus thereof, which make it possible to stably measure an amount of displacement and a moving distance of an object under measurement with an accuracy of the sub-nanometer order or below without being affected by disturbances such as fluctuations of air, mechanical vibration, etc.

Further, another object of the present invention is to provide a probe microscope, etc. which performs position measurement and control of a measurement probe with an accuracy of the sub-nanometer order or below without being affected by disturbances such as fluctuations of air, mechanical vibration, etc.

Means for Solving the Problem

In order to accomplish the objects, the present invention provides a displacement measurement apparatus and a method thereof, the apparatus comprising: intensity-modulated beam generation means for generating a pulsed beam intensity-modulated at predetermined intervals; an interference optical system for generating a plurality of interference light signals; and calculation means for calculating the unit moving distance of the object under measurement based on the plurality of interference light signals generated by the interference optical system. The interference optical system performs the steps of: splitting the pulsed beam generated by the intensity-modulated beam generation means into first and second pulsed beams; irradiating a target mirror provided on a movable object under measurement with the split first and second pulsed beams after providing a relative time difference therebetween; combining a reflected beam based on the first pulsed beam and a reflected beam based on the second pulsed beam, the two reflected beams being obtained from the irradiated target mirror, after canceling the relative time difference (at the same timing); and subjecting the two beams to interference based on an optical phase difference in relation to the unit moving distance of the object under measurement produced during the time difference to generate a plurality of interference light signals.

Further, in accordance with the present invention, the interference optical system is configured so as to provide an optical path difference between the first and second pulsed beams as means for providing a time difference.

Further, in accordance with the present invention, the interference optical system specifically comprises: at least four polarizing beam splitters; a delay optical path; and a polarization-based optical system which combines a first S-polarized pulsed beam returned and a second P-polarized pulsed beam returned, and subjects the two beams to interference based on an optical phase difference in relation to the unit moving distance of the object under measurement produced during a time difference to generate a plurality of interference light signals $I_S$ and $I_P$.

Further, the present invention provides a displacement measurement apparatus and a method thereof, the apparatus comprising: intensity-modulated beam generation means for generating a pulsed beam intensity-modulated at predetermined intervals; an interference optical system for generating a plurality of interference light signals; and calculation means for calculating the unit moving distance of the object under measurement based on the plurality of interference light signals generated by the interference optical system. The interference optical system performs the steps of: splitting a pulsed beam generated by the intensity-modulated beam generation step into first and second pulsed beams; irradiating a target mirror provided on a movable object under measurement with the split first and second pulsed beams after providing a relative time difference therebetween by sending the second pulsed beam through the delay optical path; combining a reflected beam based on the first pulsed beam and a reflected beam based on the second pulsed beam, the two reflected beams being obtained from the irradiated target mirror, after canceling the relative time difference (at the same timing) by sending the reflected beam based on the first pulsed beam through the delay optical path; and subjecting the two beams to interference based on an optical phase difference in relation to the unit moving distance of the object under measurement produced during the time difference to generate a plurality of interference light signals.

Further, in accordance with the present invention, the interference optical system is configured such that an optical path of the first pulsed beam ranging from the splitting to the irradiation of the target mirror coincides with an optical path of the second pulsed beam ranging from the reflection by the target mirror to the combination, and an optical path of the first pulsed beam ranging from the reflection by the target mirror to the combination coincides with an optical path of the second pulsed beam ranging from the splitting to the irradiation of the target mirror.

Further, in accordance with the present invention, the time difference in the interference optical system coincides with the predetermined interval in the intensity-modulated beam generation means.

Further, in accordance with the present invention, the calculation means calculates the total moving distance of the object under measurement by integrating unit moving distances of the object under measurement in the time difference.

Further, the present invention provides a displacement measurement apparatus and a method thereof, the apparatus comprising: intensity-modulated beam generation means for generating a pulsed beam intensity-modulated at predetermined intervals; an interference optical system for generating a plurality of interference light signals; and calculation means for calculating the unit moving distance of the object under measurement based on the plurality of interference light signals generated by the interference optical system. The interference optical system performs the steps of: splitting the pulsed beam generated by the intensity-modulated beam generation means into first and second pulsed beams; irradiating a target mirror provided on a movable object under measurement with the split first and second pulsed beams after providing a relative time difference therebetween by sending the second pulsed beam through the delay optical path; combining a reflected beam based on the first pulsed beam and a reflected beam based on the second pulsed beam, the two reflected beams being obtained from the irradiated target mirror, after canceling the relative time difference (at the same timing) by sending the reflected beam based on the first pulsed beam through the delay optical path; and subjecting the two beams to interference based on an optical phase difference in relation to the unit moving distance of the object under measurement produced during the time difference to generate a plurality of interference light signals. The interference optical system is configured such that an optical path of the first pulsed beam ranging from the splitting to the irradiation of the target mirror coincides with an optical path of the second pulsed beam ranging from the reflection by the target mirror to the combination, and an optical path of the first beam ranging from the reflection by the target mirror to the combination through the delay optical path coincides with an optical path of the second pulsed beam ranging from the splitting to the irradiation of the target mirror through the delay optical path.

Further, the present invention provides a stage apparatus having the movable object under measurement thereon, wherein: the stage apparatus includes the displacement measurement apparatus so as to perform positioning control of the stage apparatus at least in one axis direction based on the unit moving distance of the object under measurement calculated by the calculation means.

Further, the present invention provides a probe microscope having the movable object under measurement thereon and including a probe scanning mechanism for performing scan positioning of the probe at least in one axis direction, wherein: the probe microscope includes the displacement measurement apparatus so as to perform scan positioning control of the probe scanning mechanism at least in one axis direction based on the unit moving distance of the object under measurement calculated by the calculation means.

Effect of the Invention

As mentioned above, in accordance with the present invention, the effects of disturbances such as temperature distribution or refraction factor distribution due to fluctuations of air, mechanical vibration, etc. equally act on the first and second probe pulsed beams, making it possible to cancel the effects of the disturbances when the two pulsed beams interfere with each other. As a result, it becomes possible to stably measure the amount of displacement or moving distance of an object under measurement by means of an interference light, with a high accuracy from the sub-nanometer to picometer order, without being affected by the disturbances.

BEST MODE FOR CARRYING OUT THE INVENTION

Embodiments of a displacement measurement apparatus and a method thereof, a stage apparatus, and a probe microscope according to the present invention will be explained below with reference to the accompanying drawings.

First Embodiment

The following explains a first mode of a first embodiment of a displacement measurement apparatus and a method thereof according to the present invention, with reference to FIG. 1. The displacement measurement apparatus of the present first mode is composed of a light source unit 280 and an interferometer unit 50, as shown in FIG. 1. As shown in FIG. 1, in the light source unit 280, a linearly-polarized beam 2 from linearly-polarized laser 1 (for example, frequency stabilization He—Ne laser having a wavelength of 632.8 nm) is inputted to an acousto-optic modulator (AOM) 3. The acousto-optic modulator 3, to which a rectangular wave modulation signal 5 with a frequency f generated by a signal generator 4 is inputted, performs intensity modulation of a first order diffraction light 6 to be emitted with the frequency f. With the present mode, f=50 MHz. The intensity-modulated beam 6 is focused to an incident end face of a polarization maintaining fiber 8 through a condenser lens 7 and then transmitted to the interferometer unit 50, with linear polarization maintained.

The polarization maintaining fiber 8 is attached with the polarization optical axis rotated by 45 degrees with respect to the interferometer unit 50 so as to enable polarization splitting into a P-polarized beam (P1) and an S-polarized beam (P2). A linearly-polarized beam existing the exit end face of the polarization maintaining fiber 8 is collimated to a parallel beam 10 by a collimating lens 9 and then inputted to a non-polarizing beam splitter 11. A linearly-polarized beam 12 in the 45-degree direction which passed through the non-polarizing beam splitter 11 is subjected to polarization splitting into a P-polarized beam (P1) 14 and an S-polarized beam (P2) 15 by a polarizing beam splitter 13a. The P-polarized beam (P1) 14 passes through a polarizing beam splitter 13b and a ¼-wavelength plate 16 to become a circularly-polarized beam 17 which enters and reflects off a target mirror 18 arranged on an object under measurement 20 as a first probe beam. The circularly-polarized beam 17 then retransmits the ¼-wavelength plate 16 to become an S-polarized beam 21 which is then reflected by polarizing beam splitters 13b, 13c, and 13d, focused to the incident end face of a polarization maintaining fiber 23 by a lens 22, and then inputted to the polarization maintaining fiber 23. The polarization maintaining fiber 23 forms a delay optical path with a length of about 6000 mm. The S-polarized beam which entered the polarization maintaining fiber 23 travels a distance of about 6000 mm (with an elapsed time of 20 ns) and then returns to the polarizing beam splitter 13d. The delay optical path 23 thus provides a time difference of 20 ns which is a period of the intensity-modulated beam. An S-polarized beam 25 which exited the exit end face of the polarization maintaining fiber 23 is collimated to a parallel beam by a lens 24, reflected by the polarizing beam splitter 13d and 13a, and then inputted to the non-polarizing beam splitter 11.

On the other hand, the S-polarized beam (P2) 15 travels (tracks back) the same optical path (light path) as above in the opposite direction. This is similar to the configuration of so-called Sagnac interferometer. That is, the S-polarized beam (P2) 15 is reflected by the polarizing beam splitter 13d and then focused to the incident end face of the polarization maintaining fiber 23 by the lens 24. The S-polarized beam (P2) 15 which entered the polarization maintaining fiber 23 travels the delay optical path 23 with a length of about 6000 mm (with an elapsed time of 20 ns) and then returns to the interferometer unit 50. Then, the S-polarized beam which exited the exit end face of the polarization maintaining fiber 23 is collimated to a parallel beam 26 by the lens 22 and then reflected by the polarizing beam splitters 13d, 13c, and 13b. The S-polarized beam then passes through the ¼-wavelength plate 16 to become a circularly-polarized beam 27. The circularly-polarized beam 27 enters and reflects off the target mirror 18 as a second probe beam, and then retransmits the ¼-wavelength plate 16 to become a P-polarized beam 28. After passing through the polarizing beam splitter 13b, the P-polarized beam 28 is combined with the S-polarized beam 25 at the same timing in the polarizing beam splitter 13a and then inputted to the non-polarizing beam splitter 11.

Here, the P-polarized beam (P1) 14 and the S-polarized beam (P2) 15 are subjected to intensity modulation with a predetermined frequency (f) of 50 MHz. As shown in FIG. 2(a), each beam is composed of rectangular pulse trains 14p ($P1_0$, $P1_1$, $P1_2$, $P1_3$, $P1_4$, . . . ) and 15p ($P2_0$, $P2_1$, $P2_2$, $P2_3$, $P2_4$, . . . ) having a period of 20 ns. Both pulse trains enter the polarizing beam splitter 13a at the same timing.

On the other hand, as shown in FIG. 2(b), in a time difference of 20 ns after a pulse train 17p of the circularly-polarized beam 17 (converted from the P-polarized beam (P1) 14) enters the surface of the target mirror 18, a pulse train 27p of the circularly-polarized beam 27 (converted from the S-polarized beam (P2) 15) enters the surface of the target mirror 18 after traveling the delay optical path 23 with a length of about 6000 mm. That is, the pulse train 27p lags behind the pulse train 17p by 20 ns or one pulse period (i.e., with a time difference of one pulse period).

Further, the P-polarized beam (P1) 14 reflects off the target mirror 18, travels the delay optical path 23 with a length of about 6000 mm, and then returns to the target mirror 18. Therefore, a pulse train 25p of the P-polarized beam (P1) 14 enters the beam splitter 13a at the same timing (by canceling the relative time difference) as a pulse train 28p of the S-polarized beam (P2) 15 that has traveled the delay optical path 23 and then returned to the target mirror 18, as shown in FIG. 2(c). Specifically, the P-polarized beam (P1) 14 and the S-polarized beam (P2) 15, the two beams being split by the polarizing beam splitter 13a, propagate (travel) a completely the same optical path (light path) in opposite directions, and then return to the polarizing beam splitter 13a so as to be combined.

However, as mentioned above, both pulse trains 17p and 27p enter the surface of the moving target mirror 18 with a time difference of 20 ns (one pulse period) therebetween because of the delay optical path 23. The pulse trains 25p and 28p of both beams that have traveled the delay optical path 23 in opposite directions and then returned will enter the polarizing beam splitter 13a at the same timing (by canceling the relative time difference).

Further, as mentioned above, return beams 25 and 28 of the P-polarized beam (P1) 14 and the S-polarized beam (P2) 15 are respectively S-polarized and P-polarized beams which do not interfere with each other as they are. A combined beam 30 composed of return beams 25 and 28 reflects off the non-polarizing beam splitter 11 and then passes through, for example, a ¼-wavelength plate 31. Then, as shown by the following Formulas (1) and (2), a phase difference of ±π/2 is given. Further, a polarizing beam splitter 32 which is inclined by 45 degrees causes interference between S-polarized components contained in the return beams 25 and 28 and between P-polarized components contained therein. An interference light 33 of the S-polarized components is reflected by the polarizing beam splitter 32, received by a photoelectric transducer 34 such as a photo diode, and then converted to an electrical signal (interference signal) $I_S$ (35). After an interference light 36 of the P-polarized components penetrates the polarizing beam splitter 32, it is reflected by a prism mirror 37, received by a photoelectric transducer 38 such as a photo diode, and then converted to an electrical signal (interference signal) $I_P$ (39).

The two converted interference signals $I_S$ (35) and $I_P$ (39), respectively given by the following Formulas (1) and (2), are sent to a unit moving distance calculation unit 40.

$$I_S = I_1 + I_2 + 2(I_1 \cdot I_2)^{1/2}\cos(4\pi n\Delta D/\lambda + \pi/2) \quad (1)$$
$$= I_1 + I_2 - 2(I_1 \cdot I_2)^{1/2}\sin(4\pi n\Delta D/\lambda)$$

$$I_P = I_1 + I_2 + 2(I_1 \cdot I_2)^{1/2}\cos(4\pi n\Delta D/\lambda - \pi/2) \quad (2)$$
$$= I_1 + I_2 + 2(I_1 \cdot I_2)^{1/2}\sin(4\pi n\Delta D/\lambda)$$

where $I_1$ is a detected intensity of the return beam 25, $I_2$ is a detected intensity of the return beam 28, n is the refraction factor of air, $\Delta D$ is one pulse period, i.e., the moving distance of the object under measurement 20 during a time period of 20 ns, and $\lambda$ is the wavelength of laser beam 1.

As mentioned above, the interference optical system according to the present invention comprises: the polarization maintaining fiber 8 with the polarization optical axis rotated by 45 degrees in the polarizing beam splitter 13a so as to enable polarization splitting; the non-polarizing beam splitter 11 which reflects the combined beam 30; the polarizing beam splitters 13a to 13d which form two optical paths including the delay optical path 23 for providing a delay of, for example, one pulse period, perform polarization splitting into first and second polarized beams, and combine these polarized beams; the ¼-wave plate 16 which converts linear polarization to, for example, circular polarization; the ¼-wave plate 31 which provides a phase difference of ±π/2 in the combined beam 30 composed of the return beams 25 and 28; the polarizing beam splitter 32 inclined by 45 degrees which causes interference between S-polarized components and between P-polarized components which are respectively contained in the return beams 25 and 28; the photoelectric transducer 34 which receives the interference light 33 of the S-polarized components reflected by the polarizing beam splitter 32 and then converts it to the electrical signal (interference signal) $I_S$ (35); and the photoelectric transducer 38 which receives the interference light 36 of the P-polarized components which penetrated the polarizing beam splitter 32 and then converts it to the electrical signal (interference signal) $I_P$ (39). In particular, in accordance with the present invention, the interference optical system is configured such that an optical path of a first polarized beam 14, subjected to polarization splitting by polarizing beam splitter 13a, ranging from the splitting to the irradiation of the target mirror 18 coincides with an optical path of a second polarized beam 15 ranging from the reflection by the target mirror 18 to the combination by the polarizing beam splitter 13a, and an optical path of the first polarized beam 14 ranging from the reflection by the target mirror 18 to the combination by the polarizing beam splitter 13a through the delay optical path coincides with an optical path of the second polarized beam ranging from the splitting to the irradiation of the target mirror 18 through the delay optical path. Thus, the effects of turbulances equally act on the two beams and therefore canceled, making it possible to obtain the moving distance of the measurement object 20 with a high accuracy, without being affected by the disturbances.

Based on the received two interference signals $I_S$ (35) and $I_P$ (39), the unit moving distance calculation unit 40 calculates a unit moving distance $\Delta D$ of the object under measurement 20 in a unit time (one pulse period or 20 ns) by use of the following Formula (3) and then outputs the result to a total moving distance integration unit 42 as a unit moving distance signal 41.

$$\Delta D = (\lambda/4\pi n)\sin^{-1}\{(I_P - I_S)/(i_P + I_S)\} \quad (3)$$

where $I_1 = I_2$.

Based on the received unit moving distance signal 41, the total moving distance integration unit 42 successively integrates unit moving distances $\Delta D$ for one pulse period (20 ns) by use of Formula (4) based on the rectangular wave modulation signal 5 with a frequency (f) of 50 MHz to obtain the total moving distance D (20d) of the object under measurement 20. The result is outputted from the interferometer unit 50 as a total moving distance signal 43.

$$D = \sum_{i=0}^{N} i\Delta D \quad (4)$$

Here, N is the number of pulses of the rectangular wave modulation signal 5 included during the moving time of the object under measurement. For example, when the unit moving distance $\Delta D$ for one pulse period (20 ns) is 10 pm and the moving time of the object under measurement 20 is 160 ns as shown in FIG. 3, a total moving distance D of 80 pm is obtained by integrating unit moving distances $\Delta D$ (10 pm) over 160 ns. The result is outputted from the moving distance integration unit 42 as a measurement moving distance signal 43.

With the present first mode, as illustrated in FIG. 1, the P-polarized beam (P1) 14 and the S-polarized beam (P2) 15, split by the polarizing beam splitter 13a, propagate (travel) a completely the same optical path (light path) in opposite directions as two probe beams, and enter the surface of the target mirror 18 at different timings having a time difference of one pulse, and then return to the polarizing beam splitter 13a at the same timing so as to be combined. This generates two interference signals $I_S$ (35) and $I_P$ (39) based on optical phase differences, $(4\pi n\Delta D/\lambda + \pi/2)$ and $(4\pi n\Delta D/\lambda - \pi/2)$, in relation to the moving distance $\Delta D$ of the target mirror 18 produced during the above-mentioned time difference.

As mentioned above, the two probe beams pass through a completely the same common optical path (light path) in opposite directions. Therefore, even if temperature distribution or refraction factor distribution due to fluctuations of air, or mechanical vibration arises in the optical path, these disturbances equally affect both beams and accordingly their effects are completely canceled when both beams interfere with each other, thereby preventing the interference light from being affected by disturbances. Therefore, in accordance with the configuration of the interferometer of the present first mode, it is possible to stably measure the total moving distance D (20d) of the object under measurement 20 with an accuracy of the sub-nanometer to picometer, without controlling the temperature, humidity, acoustic vibration, and other environmental factors with a high accuracy.

A second mode of the displacement measurement apparatus and a method thereof according to the present invention will be explained below with reference to FIG. 4. The first mode is configured such that each of the first and second probe beams enters and reflects off the target mirror 18 only once in the interferometer unit 50. The second mode of the displacement measurement apparatus according to the present invention differs from the first mode in that each of the two probe beams enters and reflects off the target mirrors 18 twice resulting in a doubled phase difference and a doubled measurement sensitivity in relation to the moving distance of the same target mirror 18. Since the configuration and function of the light source unit 280 are the same as those of the first mode, explanation will be omitted.

As shown in FIG. 4, the polarization maintaining fiber 8 is attached with the polarization optical axis rotated by 45 degrees with respect to the interferometer unit 50. A linearly-polarized beam which exited the exit end face of the polarization maintaining fiber 8 is collimated to a parallel beam 10 by the collimating lens 9 and then inputted to the non-polarized beam splitter 11. The linearly-polarized beam 12 in the 45-degree direction which passed through the non-polarizing beam splitter 11 is subjected to polarization splitting into a P-polarized beam (P1) 14 and an S-polarized beam (P2) 15 by the polarizing beam splitter 13a. The P-polarized beam (P1) 14 passes through the polarizing beam splitter 13b and the ¼-wavelength plate 60 to become a circularly-polarized beam 62 which enters and reflects off a target mirror 18 arranged on the object under measurement 20 as a first probe beam. The circularly-polarized beam 62 then re-penetrates the ¼-wavelength plate 60 to become an S-polarized beam which is then reflected by the polarizing beam splitters 13b and 13c. The S-polarized beam passes through the ¼-wavelength plate 60 to become a circularly-polarized beam 63 which re-enters and reflects off the target mirror 18. The circularly-polarized beam 63 penetrates the ¼-wavelength plate 60 to become a P-polarized beam 64 which passes through the polarizing beam splitters 13c, 13d, and 13e. The P-polarized beam 64 is then focused to an incident end face of the polarization maintaining fiber 23 by the lens 24 and then inputted to the fiber. Like the first mode, the polarization maintaining fiber 23 forms a delay optical path with a length of about 6000 mm. The P-polarized beam which entered the fiber travels a distance of about 6000 mm (with an elapsed time of 20 ns) and then returns to the polarizing beam splitter 13e. The exit end face of the polarization maintaining fiber 23 is rotated by 90 degrees with respect to the incident end face thereof. The S-polarized beam 65 exiting the exit face is collimated to a parallel beam 66 by the lens 22, reflected by the polarizing beam splitters 13e, 13d, and 13a, and then inputted to the non-polarizing beam splitter 11.

On the other hand, the S-polarized beam (P2) 15 travels a completely the same optical path (light path) as above in the opposite direction. Specifically, the S-polarized beam (P2) 15 is reflected by the polarizing beam splitters 13d and 13e, focused to an incident end face of the polarization maintaining fiber 23 by the lens 22, and then inputted to the fiber. The S-polarized beam 15 which entered the fiber travels the delay optical path 23 with a length of about 6000 m (with an elapsed time of 20 ns) and then returns to the interferometer unit 50. The exit end face of the polarization maintaining fiber 23 is rotated by 90 degrees with respect to the incident end face thereof. The P-polarized beam which exited the exit end face of the polarization maintaining fiber 23 is collimated by the lens 24 to a parallel beam which passes through the polarizing beam splitters 13e, 13d, and 13c. The parallel beam passes through the ¼-wavelength plate 60 to become a circularly-polarized beam 67 which enters and reflects off the target mirror 18 as a second probe beam. The circularly-polarized beam 67 re-penetrates the ¼-wavelength plate 60 to become an S-polarized beam which is then reflected by the polarizing beam splitters 13c and 13b, and passed through the ¼-wavelength plate 60 to become a circularly-polarized beam 68 which re-enters and reflects off the target mirror 18. The circularly-polarized beam 68 penetrates the ¼-wavelength plate 60 to become a P-polarized beam 69 which passes through the polarizing beam splitter 13b. Then, the P-polarized beam 69 is combined with an S-polarized beam 66 at the same timing by the polarizing beam splitter 13a and then inputted to the non-polarizing beam splitter 11.

Here, like the first mode, the P-polarized beam (P1) 14 and the S-polarized beam (P2) 15 are subjected to intensity modulation with a frequency (f) of 50 MHz. As shown in FIG. 2(a), each beam is composed of the rectangular pulse trains $14p$ ($P1_0$, $P1_1$, $P1_2$, $P1_3$, $P1_4$, ... ) and $15p$ ($P2_0$, $P2_1$, $P2_2$, $P2_3$, $P2_4$, ... ) having a period of 20 ns. Both pulse trains enter the polarizing beam splitter 13a at the same timing.

On the other hand, as shown in FIG. 2(b), in a time difference of 20 ns after a pulse train $17p$ of the circularly-polarized beam (converted from the P-polarized beam (P1) 14) enters the surface of the target mirror 18, a pulse train $27p$ of the circularly-polarized beam (converted from the S-polarized beam (P2) 15) enters the surface of target mirror 18 after traveling the delay optical path 23 with a length of about 6000 mm (with an elapsed time of 20 ns). That is, the pulse train $27p$ lags behind the pulse train $17p$ by 20 ns or one pulse period (i.e., with a time difference of one pulse period).

Further, the P-polarized beam (P1) 14 reflects off the target mirror 18, travels the delay optical path 23 with a length of about 6000 mm, and then returns to the target mirror 18. Therefore, a pulse train $25p$ of the P-polarized beam (P1) 14 enters the beam splitter 13a at the same timing as a pulse train $28p$ of the S-polarized beam (P2) 15 that has traveled the delay optical path 23 and then returned to the target mirror 18, as shown in FIG. 2(c). Specifically, the P-polarized beam (P1) 14 and the S-polarized beam (P2) 15, the two beams being split by the polarizing beam splitter 13a, propagate (travel) a completely the same optical path (light path) in opposite directions, and then return to the polarizing beam splitter 13a so as to be combined.

However, as mentioned above, pulse trains $17p$ and $27p$ of both beams enter the surface of the moving target mirror 18 with a time difference of 20 ns (one pulse period) therebetween because of the delay optical path 23. The pulse trains $25p$ and $28p$ of both beams that have traveled the delay optical path 23 in opposite directions and then returned will enter the polarizing beam splitter 13a at the same timing.

Further, as mentioned above, the return beams 66 and 69 of the P-polarized beam (P1) 14 and the S-polarized beam (P2) 15 are respectively S-polarized and P-polarized beams which do not interfere with each other as they are. Like the first mode, a combined beam 70 composed of return beams 66 and 69 reflects off the non-polarizing beam splitter 11 and then passes through the ¼-wavelength plate 31. Then, as shown by the following Formulas (5) and (6), a phase difference of $\pm\pi/2$ is given. Further, a polarizing beam splitter 32 which is inclined by 45 degrees causes interference between S-polarized components contained in the return beams 66 and 69 and between P-polarized components contained therein. An interference light 72 of the S-polarized components is reflected by the polarizing beam splitter 32, received by a photoelectric transducer 34 such as a photo diode, and then converted to an electrical signal (interference signal) $I_S$ (73). After an interference light 74 of the P-polarized components penetrates the polarizing beam splitter 32, it is reflected by a prism mirror 37, received by a photoelectric transducer 38 such as a photo diode, and then converted to an electrical signal (interference signal) $I_P$ (75). The two converted interference signals $I_S$ (73) and $I_P$ (75), respectively given by the following Formulas (5)

and (6), are sent to the unit moving distance calculation unit 40.

$$I_S = I_1 + I_2 + 2(I_1 \cdot I_2)^{1/2}\cos(8\pi n\Delta D/\lambda + \pi/2) \quad (5)$$
$$= I_1 + I_2 - 2(I_1 \cdot I_2)^{1/2}\sin(8\pi n\Delta D/\lambda)$$

$$I_P = I_1 + I_2 + 2(I_1 \cdot I_2)^{1/2}\cos(8\pi n\Delta D/\lambda - \pi/2) \quad (6)$$
$$= I_1 + I_2 + 2(I_1 \cdot I_2)^{1/2}\sin(8\pi n\Delta D/\lambda)$$

where $I_1$ is a detected intensity of the return beam 66, $I_2$ is a detected intensity of the return beam 69, n is the refraction factor of air, $\Delta D$ is one pulse period, i.e., the unit moving distance 20d of the object under measurement 20 during a time period of 20 ns, and $\lambda$ is the wavelength of laser beam 1.

Based on the received two interference signals $I_S$ (73) and $I_P$ (75), the unit moving distance calculation unit 40 calculates a unit moving distance $\Delta D$ of the object under measurement 20 in a unit time (one pulse period or 20 ns) by use of the following Formula (7) and then outputs the result to the moving distance integration unit 42 as a unit moving distance signal 76.

$$\Delta D = (\lambda/8\pi n)\sin^{-1}\{(I_P - I_S)/(I_P + I_S)\} \quad (7)$$

where $I_1 = I_2$.

Based on the received total moving distance signal 76, the moving distance integration unit 42 successively integrates unit moving distances $\Delta D$ for one pulse period (20 ns) by use of the Formula (4) based on the rectangular wave modulation signal 5 with a frequency (f) of 50 MHz to obtain the total moving distance D (20d) of the object under measurement 20. The result is outputted from the interferometer unit 50 as a total moving distance signal 77.

With the present second mode, as illustrated in FIG. 4, the P-polarized beam (P1) 14 and the S-polarized beam (P2) 15, split by the polarizing beam splitter 13a, propagate (travel) a completely the same optical path (light path) in opposite directions as two probe beams, and enter the surface of the target mirror 18 at different timings, i.e., with a time difference of one pulse, and then return to the polarizing beam splitter 13a at the same timing so as to be combined, like the first mode. This generates two interference signals $I_S$ (73) and $I_P$ (75) based on optical phase differences, $(8\pi n\Delta D/\lambda + \pi/2)$ and $(8\pi n\Delta D/\lambda - \pi/2)$, in relation to the unit moving distance $\Delta D$ of the target mirror 18 produced during the above-mentioned time difference.

As mentioned above, the two probe beams pass through a completely the same common optical path (light path) in opposite directions. Therefore, even if temperature distribution or refraction factor distribution due to fluctuations of air, or mechanical vibration arises in the optical path, these disturbances equally affect both beams and accordingly their effects are completely canceled when both beams interfere with each other, thereby preventing the interference light from being affected by disturbances. Therefore, in accordance with the configuration of the interferometer of the present second mode, it is possible to stably measure the moving distance 20d of the object under measurement 20 with an accuracy of the sub-nanometer to picometer, without controlling the temperature, humidity, acoustic vibration, and other environmental factors with a high accuracy. Further, with the present second mode, each of the two probe beams enters the target mirror 18 twice resulting in a doubled optical phase difference and a doubled measurement sensitivity in relation to the same unit moving distance $\Delta D$, as shown by the Formulas (5) and (6).

A third mode of the displacement measurement apparatus and a method thereof according to the present invention will be explained below with reference to FIG. 5. The third mode of the displacement measurement apparatus according to the present invention uses pulsed laser to generate an intensity-modulated beam, as shown in FIG. 5. Specifically, in the light source unit 290, a pulsed linearly-polarized beam 102 having a wavelength of 780 nm, a pulse width of 100 fs, and a repetition frequency of 50 MHz emitted from pulsed laser 101 is split into two beams by a beam splitter 103 having a ratio of the transmission factor to the reflection factor of 96/4. A pulsed linearly-polarized beam 105 which penetrated the beam splitter 103 then enters the non-polarizing beam splitter 11 of the interferometer unit 50, with the polarization optical axis rotated by 45 degrees. After the linearly-polarized beam 105 in the 45-degree direction passes through the non-polarizing beam splitter 11, it is subjected to polarization splitting into a P-polarized beam (P1) 106 and an S-polarized beam (P2) 107 by a polarizing beam splitter 13a. The P-polarized beam (P1) 106 passes through the polarizing beam splitter 13b and then the ¼-wavelength plate 60 to become a circularly-polarized beam 108 which enters and reflects off the target mirror 18 arranged on the object under measurement 20 as a first probe beam. The circularly-polarized beam 108 re-penetrates the ¼-wavelength plate 60 to become an S-polarized beam which reflects off the polarizing beam splitters 13b and 13c and penetrates the ¼-wavelength plate 60 to become a circularly-polarized beam 109 which re-enters and reflects off the target mirror 18. The circularly-polarized beam 109 penetrates the ¼-wavelength plate 60 to become a P-polarized beam 110 which is led to a delay optical path 116. Although the polarization maintaining fiber 23 is used as a delay optical path in the first and second modes, an optical fiber cannot be used for pulsed laser beam having a pulse width of 100 fs because a pulse waveform may be largely deformed by dispersion. With the present third mode, therefore, the delay optical path 116 is formed such that laser beam travels (advances and returns) between prism mirrors 112a and 112b opposed to each other, as shown in FIG. 5. After the P-polarized beam 110 passes through a mirror 111 having an opening at the center thereof, it travels (advances and returns) between mirrors 111 and 115, being repetitively reflected by prism mirrors 112a, 112b, and 112c opposed to each other, over a distance of about 6000 mm (with an elapsed time of 20 ns); and then returns to the polarizing beam splitter 13d. When the return beam 117 advances and returns through the ¼-wavelength plate 114 in the delay optical path, it has been converted to an S-polarized beam. The S-polarized beam 117 reflects off the polarizing beam splitters 13d and 13a, and then enters the non-polarizing beam splitter 11 as a return beam 118.

On the other hand, the S-polarized beam (P2) 107 penetrates a completely the same optical path (light path) as above in the opposite direction. Specifically, the S-polarized beam (P2) 107 is reflected by the polarizing beam splitter 13d and then led to the delay optical path 116 as a reflective S-polarized beam 119. In this case, the return beam 121 from the delay optical path 116 has been converted to a P-polarized beam. The P-polarized beam 121 passes through the polarizing beam splitters 13d and 13c and then the ¼-wavelength plate 60 to become a circularly-polarized beam 122 which enters and reflects off the target mirror 18 as a second probe beam. The circularly-polarized beam 122 re-penetrates the ¼-wavelength plate 60 to become an S-polarized beam which reflects off the polarizing beam splitters 13c and 13b and passes through the ¼-wavelength plate 60 to become a circularly-polarized beam 123 which re-enters and reflects off the target mirror 18. The circularly-polarized beam 123 penetrates the ¼-wavelength plate 60 to become a P-polarized beam 124 which passes through the polarizing beam splitters 13b and 13a and then enters the non-polarizing beam splitter 11.

Here, the P-polarized beam (P1) 106 and the S-polarized beam (P2) 107 are pulsed linearly-polarized beams having a repetition frequency of 50 MHz. As shown in FIG. 6(a), each beam is composed of pulse trains 106p (P1$_0$, P1$_1$, P1$_2$, P1$_3$, P1$_4$, . . . ) and 107p (P2$_0$, P2$_1$, P2$_2$, P2$_3$, P2$_4$, . . . ) having a period of 20 ns. Both pulse trains enter the polarizing beam splitter 13a at the same timing.

On the other hand, as shown in FIG. 6(b), in a time difference of 20 ns after pulse trains 108p and 109p of the circularly-polarized beams 108 and 109 (converted from the P-polarized beam (P1) 106) enter the surface of the target mirror 18, pulse trains 122p and 123p of the circularly-polarized beams 122 and 123 (converted from the S-polarized beam (P2) 107) enter the surface of the target mirror 18 after traveling the delay optical path 116 with a length of about 6000 mm.

Further, the P-polarized beam (P1) 106 reflects off the target mirror 18, travels the delay optical path 116 with a length of about 6000 mm, and then returns to the target mirror 18. Therefore, a pulse train 118p of the P-polarized beam (P1) 106 enters the beam splitter 13a at the same timing as a pulse train 24p of the S-polarized beam (P2) 107 that has traveled the delay optical path 116 and then returned to the target mirror 18, as shown in FIG. 6(c). Specifically, the P-polarized beam (P1) 106 and the S-polarized beam (P2) 107, the two beams being split by the polarizing beam splitter 13a, propagate (travel) a completely the same optical path (light path) in opposite directions, and then return to the polarizing beam splitter 13a so as to be combined.

However, as mentioned above, pulse trains 108p, 109p, 122p, and 123p of both beams enter the surface of the moving target mirror 18 with a time difference of 20 ns (one pulse period) therebetween because of the delay optical path 116. The pulse trains 118p and 124p of both beams that have traveled the delay optical path 116 in opposite directions and then returned will enter the polarizing beam splitter 13a at the same timing.

Further, as mentioned above, the return beams 118 and 124 of the P-polarized beam (P1) 106 and the S-polarized beam (P2) 107 are respectively S-polarized and P-polarized beams which do not interfere with each other as they are. Like the second mode, a combined beam 125 composed of return beams 118 and 124 reflects off the non-polarizing beam splitter 11 and then passes through the ¼-wavelength plate 31. Then, as shown by the Formulas (5) and (6), a phase difference of ±π/2 is given. Further, a polarizing beam splitter 32 which is inclined by 45 degrees causes interference between S-polarized components contained in the return beams 118 and 124 and between P-polarized components contained therein. An interference light 126 of the S-polarized components is reflected by the polarizing beam splitter 32, received by a photoelectric transducer 34 such as a photo diode, and then converted to an electrical signal (interference signal) I$_S$ (127). After an interference light 128 of the P-polarized components penetrates the polarizing beam splitter 32, it is reflected by the prism mirror 37, received by a photoelectric transducer 38 such as a photo diode, and then converted to an electrical signal (interference signal) I$_P$ (129). Two interference signals 127 and 129, given by the Formulas (5) and (6), are sent to the unit moving distance calculation unit 40. Based on the received two interference signals 127 and 129, the unit moving distance calculation unit 40 calculates a unit moving distance ΔD of the object under measurement 20 in a unit time (one pulse period or 20 ns) by use of the Formula (7) and then outputs the result to the moving distance integration unit 42 as a unit moving distance signal 130. Based on a pulse signal 286 having a repetition frequency of 50 MHz obtained in the light source unit 290 by receiving a pulsed linearly-polarized beam 104 reflected by the beam splitter 103, with a photoelectric transducer 285 such as a photo diode, the moving distance integration unit 42 successively integrates unit moving distances ΔD for one pulse period (20 ns) by use of the Formula (4) to obtain the total moving distance D (20d) of the object under measurement 20. The result is outputted from the interferometer unit 50 as a total moving distance signal 131.

With the present third mode, as illustrated in FIG. 5, the P-polarized beam (P1) 106 and the S-polarized beam (P2) 107, split by the polarizing beam splitter 13a, propagate a completely the same optical path (light path) in opposite directions as two probe beams, and enter the surface of the target mirror 18 at different timings, i.e., with a time difference of one pulse, and then return to the polarizing beam splitter 13a at the same timing so as to be combined, like the first mode. This generates two interference signals I$_S$ (127) and I$_P$ (129) based on optical phase differences, $(8\pi n\Delta D/\lambda + \pi/2)$ and $(8\pi n\Delta D/\lambda - \pi/2)$, in relation to the unit moving distance ΔD of the target mirror 18 produced during the above-mentioned time difference.

As mentioned above, the two probe beams pass through a completely the same common optical path (light path) in opposite directions. Therefore, even if temperature distribution or refraction factor distribution due to fluctuations of air, or mechanical vibration arises in the optical path, these disturbances equally affect both beams and accordingly their effects are completely canceled when both beams interfere with each other, thereby preventing the interference light from being affected by disturbances. Therefore, in accordance with the configuration of the interferometer of the present third mode, it is possible to stably measure the moving distance 20d of the object under measurement 20 with an accuracy of the sub-nanometer to picometer, without controlling the temperature, humidity, acoustic vibration, and other environmental factors with a high accuracy. Further, with the present third mode, like the second mode, each of the two probe beams enters the target mirror 18 twice resulting in a doubled optical phase difference and a doubled measurement sensitivity in relation to the same unit moving distance ΔD, as shown by the Formulas (5) and (6).

A fourth mode of the displacement measurement apparatus and a method thereof according to the present invention will be explained below with reference to FIG. 7. As shown in FIG. 7, the fourth mode of the displacement according to the present invention uses an acousto-optic modulator to generate an intensity-modulated beam like the first and second modes as well as prism mirrors opposed to each other for the delay optical path like the third mode. Since the configuration and function of the light source unit 280 are the same as those of the first mode, explanation will be omitted. As shown in FIG. 7, the polarization maintaining fiber 8 is attached with the polarization optical axis rotated by 45 degrees with respect to the interferometer unit 50. A linearly-polarized beam which exited the exit end face of the polarization maintaining fiber 8 is collimated to a parallel beam 10 by the collimating lens 9 and then inputted to the non-polarizing beam splitter 11. The linearly-polarized beam 12 in the 45-degree direction which passed through the non-polarizing beam splitter 11 is subjected to polarization splitting into a P-polarized beam (P1) 14 and an S-polarized beam (P2) 15 by the polarizing beam splitter 13a. The P-polarized beam (P1) 14 passes through the polarizing beam splitter 13b and then the ¼-wavelength plate 60 to become a circularly-polarized beam 62 which enters and reflects off the target mirror 18 arranged on the object under measurement 20 as a first probe beam. The circularly-polarized beam 62 re-penetrates the ¼-wavelength plate 60 to become an S-polarized beam which reflects off the polarizing beam splitters 13b and 13c and penetrates the ¼-wavelength plate 60 to become a circularly-polarized beam 63 which re-enters and reflects off the target mirror 18. The circularly-polarized beam 63 penetrates the ¼-wavelength plate 60 to become a P-polarized beam 64 which is led to the delay optical path 116. With the present fourth mode, the delay optical path 116 is formed such that laser beam travels (advances and returns) between prism mirrors 112a and 112b, like the third mode. The P-polarized beam 64 is focused to an incident end face of the polarization maintaining fiber 142 by a lens 141, inputted to the fiber, and then led to the delay optical path 116. The P-polarized beam which exited the exit end face of the polarization maintaining fiber 142 is collimated to a parallel beam 144 by the lens 143, which passes through the mirror 111 having an opening at the center thereof. Then, the parallel beam 144 travels (advances and returns) between the mirrors 111 and 115, being repetitively reflected by prism mirrors 112a, 112b, and 112c opposed to each other, over a distance of about 6000 mm (with an elapsed time of 20 ns); passes through a lens 143, the polarization maintaining fiber 142, and the lens 141 again; and then returns to the polarizing beam splitter 13d. When the return beam advances and returns through the ¼-wavelength plate 114 in the delay optical path, it has been converted to an S-polarized beam 146. The S-polarized beam 146 is reflected by the polarizing beam splitters 13d and 13a and then inputted to the non-polarizing beam splitter 11 as a return beam 147.

On the other hand, the S-polarized beam (P2) 15 travels a completely the same optical path as above in the opposite direction. Specifically, the S-polarized beam (P2) 15 reflects off the polarizing beam splitter 13d and then passes through the lens 141, the polarization maintaining fiber 142, and the lens 143. Then, the S-polarized beam 15 is led to the delay optical path 116. An S-polarized beam 148 which is collimated to a parallel beam by the lens 143 travels a distance of about 6000 mm (with an elapsed time of 20 ns), passes through the lens 143, the polarization maintaining fiber 142, and the lens 141 again; and returns to the polarizing beam splitter 13d. When the return beam advances and returns through the ¼-wavelength plate 114 in the delay optical path, it has been converted to a P-polarized beam 150. The P-polarized beam 151 collimated to a parallel beam by a lens 141 passes through the polarizing beam splitters 13d and 13c and then the ¼-wavelength plate 60 to become a circularly-polarized beam 152 which enters and reflects off the target mirror 18 as a second probe beam. The circularly-polarized beam 152 re-penetrates the ¼-wavelength plate 60 to become an S-polarized beam which reflects off the polarizing beam splitters 13b and 13c and penetrates the ¼-wavelength plate 60 to become a circularly-polarized beam 153 which re-enters and reflects off the target mirror 18. The circularly-polarized beam 153 penetrates the ¼-wavelength plate 60 to become a P-polarized beam 154 which passes through the polarizing beam splitter 13b and then enters the polarizing beam splitter 13a. Then, the P-polarized beam 154 is combined with an S-polarized beam 147 and then inputted to the non-polarizing beam splitter 11.

Processing for obtaining the amount of displacement from subsequent interference signals is the same as that of the second mode. The return beams 147 and 154 of the P-polarized beam (P1) 14 and the S-polarized beam (P2) 15 are respectively S-polarized and P-polarized beams that do not interfere with each other as they are. Like the first mode, a combined beam 155 composed of return beams 147 and 154 reflects off the non-polarizing beam splitter 11 and then passes through the ¼-wavelength plate 31. Then, a phase difference of ±π/2 is given. Further, a polarizing beam splitter 32 which is inclined by 45 degrees causes interference between S-polarized components contained in the return beams 147 and 154 and between P-polarized components contained therein. An interference light 156 of the S-polarized components is reflected by the polarizing beam splitter 32, received by a photoelectric transducer 34 such as a photo diode, and then converted to an electrical signal (interference signal) $I_S$ (157). After an interference light 158 of the P-polarized components penetrates the polarizing beam splitter 32, it is reflected by the prism mirror 37, received by a photoelectric transducer 38 such as a photo diode, and then converted to an electrical signal (interference signal) $I_P$ (159). Two interference signals $I_S$ (157) and $I_P$ (159), given by the Formulas (5) and (6), are sent to the unit moving distance calculation unit 40. Based on the received two interference signals 157 and 159, the unit moving distance calculation unit 40 calculates a unit moving distance $\Delta D$ of the object under measurement 20 in a unit time (one pulse period or 20 ns) by use of the Formula (7) and then outputs the result to the moving distance integration unit 42 as a unit moving distance signal 160. Based on the received unit moving distance signal 160, the moving distance integration unit 42 successively integrates unit moving distances $\Delta D$ for one pulse period (20 ns) by use of the Formula (4) based on the rectangular wave modulation signal 5 with a frequency (f) of 50 MHz to obtain the total moving distance D (20d) of the object under measurement 20. The result is outputted from the interferometer unit 50 as a total moving distance signal 161.

With the present fourth mode, as illustrated in FIG. 7, the P-polarized beam (P1) 14 and the S-polarized beam (P2) 15, split by the polarizing beam splitter 13a, propagate (travel) a completely the same optical path (light path) in opposite directions as two probe beams, and enter the surface of the target mirror 18 at different timings, i.e., with a time difference of one pulse, and then return to the polarizing beam splitter 13a at the same timing so as to be combined, like the first and second modes. This generates an interference signal based on an optical phase difference in relation to the unit moving distance $\Delta D$ of the target mirror 18 produced during the above-mentioned time difference.

As mentioned above, the two probe beams pass through a completely the same common optical path (light path) in opposite directions. Therefore, even if temperature distribution or refraction factor distribution due to fluctuations of air, or mechanical vibration arises in the optical path, these disturbances equally affect both beams and accordingly their effects are completely canceled when both beams interfere with each other, thereby preventing the interference light from being affected by disturbances. Therefore, in accordance with the configuration of the interferometer of the present fourth mode, it is possible to stably measure the moving distance 20d of the object under measurement 20 with an accuracy of the sub-nanometer to picometer, without controlling the temperature, humidity, acoustic vibration, and other environmental factors with a high accuracy. Further, with the present fourth mode, each of the two probe beams enters the target mirror 18 twice resulting in a doubled optical phase difference and a doubled measurement sensitivity in relation to the same unit moving distance $\Delta D$, as shown by the Formulas (5) and (6).

A fifth mode of the displacement measurement apparatus and a method thereof according to the present invention will be explained below with reference to FIG. 8. The fifth mode of the displacement measurement apparatus obtains the moving distance from four interference lights each having a phase shift, as shown in FIG. 8. Since the configuration and function of the light source unit 280 are the same as those of the first mode, explanation will be omitted. Further, since the delay optical path composed of an optical system for generating two probe beams and the polarization maintaining fiber 23 is the same as that of the first mode, explanation will be omitted. Two return beams 25 and 28 are respectively S-polarized and P-polarized beams that do not interfere with each other as they are. After the orthogonally polarized beams 30 composed of the return beams 25 and 28 reflects off the non-polarizing beam splitter 11 and then penetrates a ½-wavelength plate 171, the polarization direction is rotated by 45 degrees. Then, the orthogonally polarized beams 30 are split into two beams by a non-polarizing beam splitter 172. That is, when the return beams 25 and 28 penetrate the ½-wavelength plate 171 which rotates the polarization direction by 45 degrees, interference occurs between S-polarized components contained in the return beams 25 and 28 and between P-polarized components contained therein. Then, the orthogonally polarized beams 173 reflected by the non-polarizing beam splitter 172 are inputted to a polarizing beam splitter 174 and then split into two interference lights 175 and 177 having a phase shift of 180 degrees (π). An interference light 175 is received by a photoelectric transducer 176 such as a photo diode and then converted to an electrical signal (interference signal) $I_a$ (179). An interference light 177 having a phase shift of 180 degrees is received by a photoelectric transducer 178 and then converted to an electrical signal (interference double number) $I_b$ (180). The orthogonally polarized beams 181 which penetrated the non-polarizing beam splitter 172 penetrates the ¼-wavelength plate 182 and then enters the polarizing beam splitter 174 with a phase difference of ±90 degrees (±π/2) added. Then, the orthogonally polarized beams 181 are split into two interference lights 183 and 185 having a phase shift of 180 degrees (π). An interference light 183 is received by a photoelectric transducer 184 such as a photo diode and then converted to an electrical signal (interference signal) $I_c$ (187). An interference light 185 with a phase shift of 180 degrees is received by a photoelectric transducer 186 and then converted to an electrical signal (interference signal) $I_d$ (188). The four interference signals $I_a$ (179), $I_b$ (180), $I_c$ (187), and $I_d$ (188) are respectively given by Formulas (8) to (11).

$$I_a = I_1 + I_2 + 2(I_1 \cdot I_2)^{1/2}\cos(4\pi n \Delta D / \lambda) \quad (8)$$

$$I_b = I_1 + I_2 + 2(I_1 \cdot I_2)^{1/2}\cos(4\pi n \Delta D / \lambda + \pi) \quad (9)$$
$$= I_1 + I_2 - 2(I_1 \cdot I_2)^{1/2}\cos(4\pi n \Delta D / \lambda)$$

$$I_c = I_1 + I_2 + 2(I_1 \cdot I_2)^{1/2}\cos(4\pi n \Delta D / \lambda + \pi/2) \quad (10)$$
$$= I_1 + I_2 - 2(I_1 \cdot I_2)^{1/2}\sin(4\pi n \Delta D / \lambda)$$

$$I_d = I_1 + I_2 + 2(I_1 \cdot I_2)^{1/2}\cos(4\pi n \Delta D / \lambda + 3\pi/2) \quad (11)$$
$$= I_1 + I_2 + 2(I_1 \cdot I_2)^{1/2}\sin(4\pi n \Delta D / \lambda)$$

Based on Formulas (8) to (11) and the following Formula (12), a unit moving distance calculation unit 189 calculates the unit moving distance ΔD of the object under measurement 20 per unit time (one pulse period or 20 ns) and then outputs the result to a moving distance integration unit 191 as a unit moving distance signal 190.

$$\Delta D = (\lambda/4\pi n)\tan^{-1}\{(I_d - I_c)/(I_a - I_b)\} \quad (12)$$

Based on the received unit moving distance signal 190, the moving distance integration unit 191 successively integrates unit moving distances ΔD for one pulse period (20 ns) by use of the Formula (4) based on the rectangular wave modulation signal 5 with a frequency (f) of 50 MHz to obtain the total moving distance D (20*d*) of the object under measurement 20. The result is outputted from the interferometer unit 50 as a total moving distance signal 192.

With the present fifth mode, as illustrated in FIG. 8, the P-polarized beam (P1) 14 and the S-polarized beam (P2) 15, split by the polarizing beam splitter 13*a*, propagate a completely the same optical path (light path) in opposite directions as two probe beams, and enter the surface of the target mirror 18 at different timings, i.e., with a time difference of one pulse, and then return to the polarizing beam splitter 13*a* at the same timing so as to be combined. This generates an interference signal based on an optical phase difference in relation to the moving distance of the target mirror 18 produced during the above-mentioned time difference.

As mentioned above, the two probe beams pass through a completely the same common optical path (light path) in opposite directions. Therefore, even if temperature distribution or refraction factor distribution due to fluctuations of air, or mechanical vibration arises in the optical path, these disturbances equally affect both beams and accordingly their effects are completely canceled when both beams interfere with each other, thereby preventing the interference light from being affected by disturbances. Therefore, in accordance with the configuration of the interferometer of the present fifth mode, it is possible to stably measure the moving distance 20*d* of the object under measurement 20 with an accuracy of the sub-nanometer to picometer, without controlling the temperature, humidity, acoustic vibration, and other environmental factors with a high accuracy.

A sixth mode of the displacement measurement apparatus and a method thereof according to the present invention will be explained below with reference to FIG. 9. Like the fifth mode, the sixth mode of the displacement measurement apparatus obtains the moving distance from four interference lights each having a phase shift, as shown in FIG. 9. Since the configuration and function of the light source unit 280 are the same as those of the first mode, explanation will be omitted. Further, since the delay optical path composed of an optical system for generating two probe beams and the polarization maintaining fiber 23 is the same as that of the first mode, explanation will be omitted. Two return beams 25 and 28 are respectively S-polarized and P-polarized beams that do not interfere with each other as they are. After the orthogonally polarized beams 30 composed of the return beams 25 and 28 is reflected by the non-polarizing beam splitter 11, it is expanded by a beam expander 201. An expansion beam 202 is split into four orthogonally polarized beams 204, 205, 206, and 207 by a DOE (Diffractive Optical Element) 203 and then inputted to a phase shift mask 208 made of a birefringent material. The phase shift mask 208 is split into four areas 208*a*, 208*b*, 208*c*, and 208*d* corresponding to the four orthogonally polarized beams 204 to 207 to provide a phase shift of 0, 90, 180, and 270 degrees between polarized beams which penetrate each area and perpendicularly intersect with each other. When the four orthogonally polarized beams each having a phase shift penetrate a polarizing plate 209 having a polarization angle of 45 degrees with respect to both polarization directions, interference occurs between them. Four interference lights 210 to 213 are received by a photoelectric transducer 214 (split into four portions) and then respectively converted to electrical signals 215 to 218. The four interference signals 215 to 218 are respectively given by the Formulas (8) to (11), like the 7th mode. Based on the Formula (12) from the Formulas (8) to (11), the unit moving distance calculation unit 189 calculates the unit moving distance ΔD of the object under measurement 20 per unit time (one pulse period or 20 ns) and then outputs the result to the moving distance integration unit 191 as a unit moving distance signal 220. The moving distance integration unit 191 successively integrates unit moving distances ΔD for one pulse period (20 ns) by use of the Formula (4) based on the rectangular wave modulation signal 5 with a frequency (f) of 50 MHz to obtain the total moving distance D (20d) of the object under measurement 20. The result is outputted from the interferometer unit 50 as a total moving distance signal 221.

With the present sixth mode, as illustrated in FIG. 9, the P-polarized beam (P1) 14 and the S-polarized beam (P2) 15, split by the polarizing beam splitter 13a, propagate a completely the same optical path (light path) in opposite directions as two probe beams, and enter the surface of the target mirror 18 at different timings, i.e., with a time difference of one pulse, and then return to the polarizing beam splitter 13a at the same timing so as to be combined. This generates an interference signal based on an optical phase difference in relation to the moving distance of the target mirror 18 produced during the above-mentioned time difference.

As mentioned above, the two probe beams pass through a completely the same common optical path (light path) in opposite directions. Therefore, even if temperature distribution or refraction factor distribution due to fluctuations of air, or mechanical vibration arises in the optical path, these disturbances equally affect both beams and accordingly their effects are completely canceled when both beams interfere with each other, thereby preventing the interference light from being affected by disturbances. Therefore, in accordance with the configuration of the interferometer of the present sixth mode, it is possible to stably measure the moving distance D (20d) of the object under measurement 20 with an accuracy of the sub-nanometer to picometer, without controlling the temperature, humidity, acoustic vibration, and other environmental factors with a high accuracy.

Second Embodiment

The following explains a second embodiment which applies the displacement measurement apparatus of the first to sixth modes of the first embodiment according to the present invention to stage positioning control, with reference to FIG. 10. A stage apparatus is configured such that a Y stage 231y is mounted on an X stage 231x and a sample holder 233 is mounted on the Y stage 231y. A sample 234 is arranged on the sample holder. Further, on the sample holder 233, bar mirrors 235x and 235y having a planar accuracy of 1/20 wavelength are fixed respectively in the x and y directions as target mirrors. Since the configuration and function of the light source unit 280 are the same as those of the first mode of the first embodiment, explanation will be omitted. An intensity-modulated beam 6 is focused to an incident end faces of three polarization maintaining fibers 8 by a condenser lens 7 through a coupling element 230, and then transmitted to three interferometer units 50a, 50b, and 50c, with linear polarization maintained. With the present second embodiment, the configuration of the interferometer units 50a, 50b, and 50c coincides with that of the interferometer unit 50 in the second mode shown in FIG. 4. It may be possible that the unit moving distance calculation units 40 and 189 and the total moving distance integration units 42 and 191 in the interferometer unit 50 be shared by the three interferometer units 50a, 50b, and 50c.

The moving distance of a bar mirror 235x is measured by the interferometer units 50a and 50b, and then outputted as x-direction moving distance signals 77a and 77b. The average moving distance is calculated by the operation unit 240 together with yawing and then sent to an X stage control unit 241x as an x-direction average moving distance signal 77x. The X stage control unit 241x compares an X stage position setup signal 245x with the x-direction average moving distance signal 77x, sends an X stage control signal 242x according to the difference therebetween to the X stage 231x, and positions the X stage 231 at a target position. On the other hand, the moving distance of a bar mirror 235y is measured by the interferometer unit 50c and then sent to a Y stage control unit 241y as a y-direction moving distance signal 77y. The Y stage control unit 241y compares a Y stage position setup signal 245y with the y-direction moving distance signal 77y, sends a Y stage control signal 242y according to the difference therebetween to the Y stage 231y, and positions the Y stage 231y at a target position.

As illustrated in FIG. 10, with the interferometer unit according to the second embodiment, the two probe beams pass through a completely the same common optical path. Therefore, even if temperature distribution or refraction factor distribution due to fluctuations of air, or mechanical vibration arises in the optical path, these disturbances equally affect both beams and accordingly their effects are completely canceled when both beams interfere with each other, thereby preventing the interference light from being affected by disturbances. Therefore, in accordance with the configuration of the interferometer of the present second embodiment, it is possible to stably measure the moving distance of the X stage 231x and the Y stage 231y with an accuracy of the sub-nanometer to picometer and position the sample 234 with a high accuracy, without controlling the temperature, humidity, acoustic vibration, and other environmental factors with a high accuracy.

Of course, it is possible to apply the interferometer unit explained in the first embodiment as the interferometer units 50a, 50b, and 50c in the second embodiment according to the present invention.

Third Embodiment

Then, the following explains a third embodiment which applies the displacement measurement apparatus shown in the first to sixth modes of the first embodiment according to the present invention to probe positioning control of a probe microscope, with reference to FIG. 11 The probe microscope comprises: a probe control unit 253, a probe scanning mechanism 255 which scans a probe 256 in the xyz directions based on a probe control signal 254 obtained from the probe control unit 253, interferometer units 50d, 50e, and 50f which measure the position of the probe 256 scanned in the xyz directions by the probe scanning mechanism 255, and a light source unit 280 which transmits a beam intensity-modulated with a frequency f to each of the interferometer units 50d, 50e, and 50f. Since the configuration of the interferometer units 50d, 50e, and 50f is the same as that of the interferometer unit 50 in the first mode shown in FIG. 1, explanation will be omitted. It may be possible that the unit moving distance calculation units 40 and 189 and the total moving distance integration units 42 and 191, the four units being in the interferometer unit 50, be shared by the three interferometer units 50d, 50e, and 50f. Further, since the light source unit 280 is the same as that in the first mode, explanation will be omitted.

Meanwhile, the intensity-modulated beam 6 is focused to an incident end face of three polarization maintaining fibers 8 by the condenser lens 7 through the coupling element 230 and then transmitted to the three interferometer units 50d, 50e, and 50f, with linear polarization maintained. The three interferometer units 50d, 50e, and 50f measure the position of the probe 256 in each of the x, y, and z directions. Each of measurement signals 251x, 251y, and 251z is sent to the probe control unit 253. The probe control unit 253 compares measurement signals with target positions, sends the probe control signal 254 according to the difference therebetween to the probe scanning mechanism 255, and performs feedback control of the probe 256 to position it at a target position.

Of course, it is possible to apply the interferometer unit explained in the first embodiment as interferometer units 50d, 50e, and 50f in the third embodiment according to the present invention.

Further, with the third embodiment, an Atomic Force Microscope (AFM) is shown as a probe microscope. In accordance with the third embodiment, it is possible to stably measure a pattern width 271w and a pattern height 271h of a micropattern 271 formed on a sample (a silicon substrate such as a wafer) 270 under measurement with an accuracy of the sub-nanometer to picometer, without being affected by temperature distribution or refraction factor distribution due to fluctuations of air, or mechanical vibration. The probe microscope according to the third embodiment is not limited to an AFM but applicable to an STM (Scanning Tunneling Microscope), MFM (Magnetic Force Microscope), SCN (Scanning Capacitance Microscope), KFM (Kelvin Force Microscope), NSOM (Near-Field Scanning Optical Microscope), and other general probe microscopes which acquire geometric information and physical properties information of an object under measurement based on an interaction between a probe and a microfield under measurement.

With the first embodiment, pulse trains of two probe beams are shifted by one pulse period as shown in FIGS. 2 and 6. However, the present invention is not limited thereto, and the amount of shift between both pulse trains can be set to any given values.

As mentioned above, in accordance with the embodiments according to the present invention, a configuration based on an interferometer of the common optical path type makes it possible to downsize a displacement measurement apparatus which can be applied even if the space around the object under measurement is small. Further, in accordance with the embodiments according to the present invention, it is not necessity to control the temperature, humidity, mechanical vibration, and other environmental conditions with a high accuracy. Therefore, the economical effects will be remarkably improved in terms of apparatus cost, apparatus size, and usability.

In accordance with the present invention, it is possible to provide a displacement measurement method and an apparatus thereof that can stably measure the amount of displacement or moving distance of an object under measurement with an accuracy of the sub-nanometer to picometer.

Figure 1:
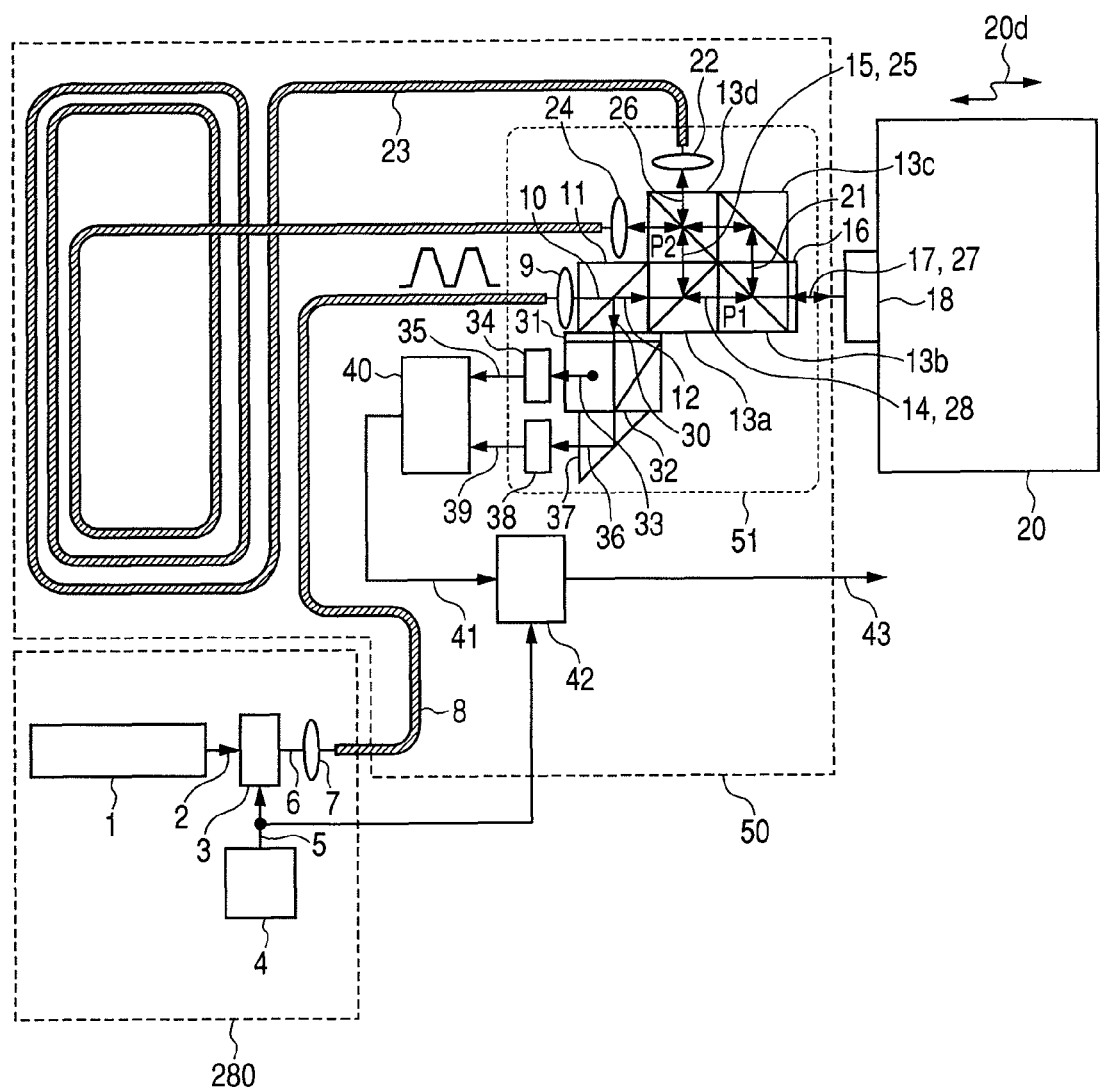
FIG. 1 is a schematic configuration diagram of a first mode of a displacement measurement apparatus of a first embodiment according to the present invention.
Figure 2:
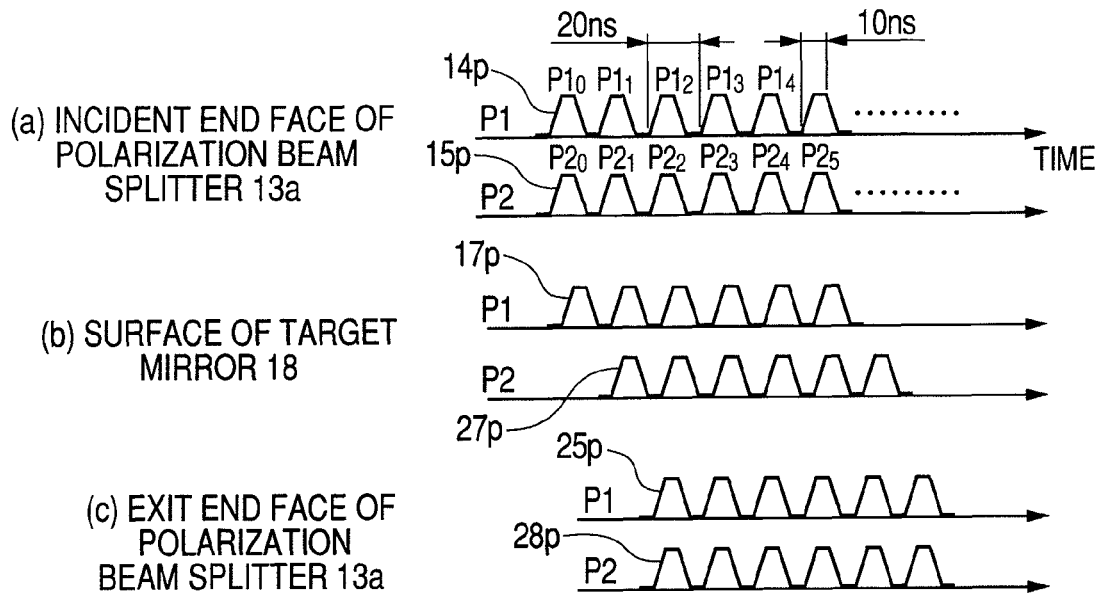
FIG. 2 are schematic diagrams showing a relations of pulse trains (on the time axis) of two probe beams in the first, second, fourth, fifth, and sixth modes of the first embodiment according to the present invention.
Figure 3:
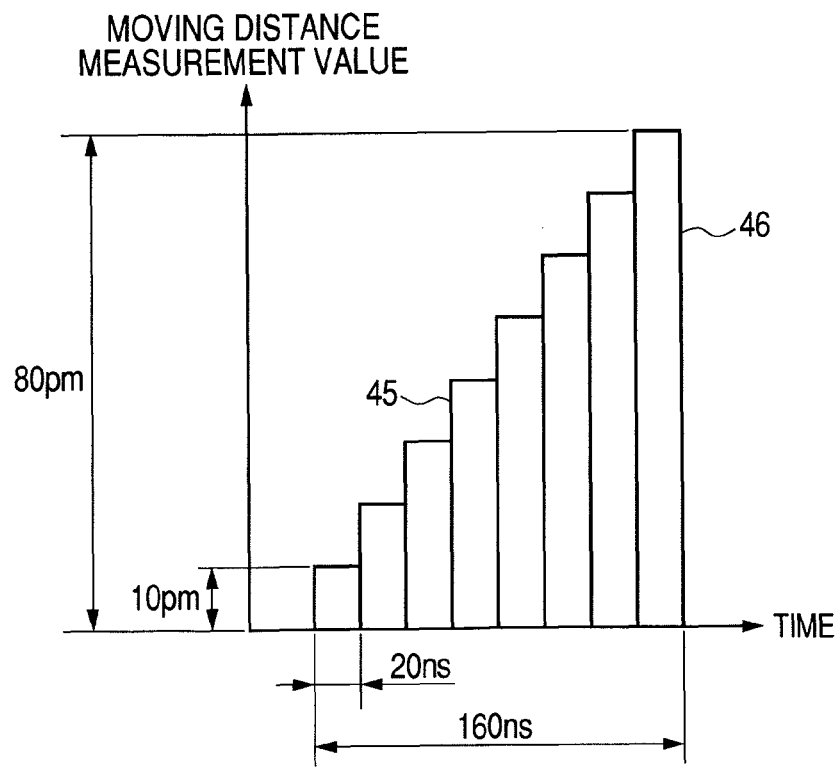
FIG. 3 is a schematic diagram showing a process for integrating unit moving distances to obtain a total moving distance in the first embodiment according to the present invention.
Figure 4:
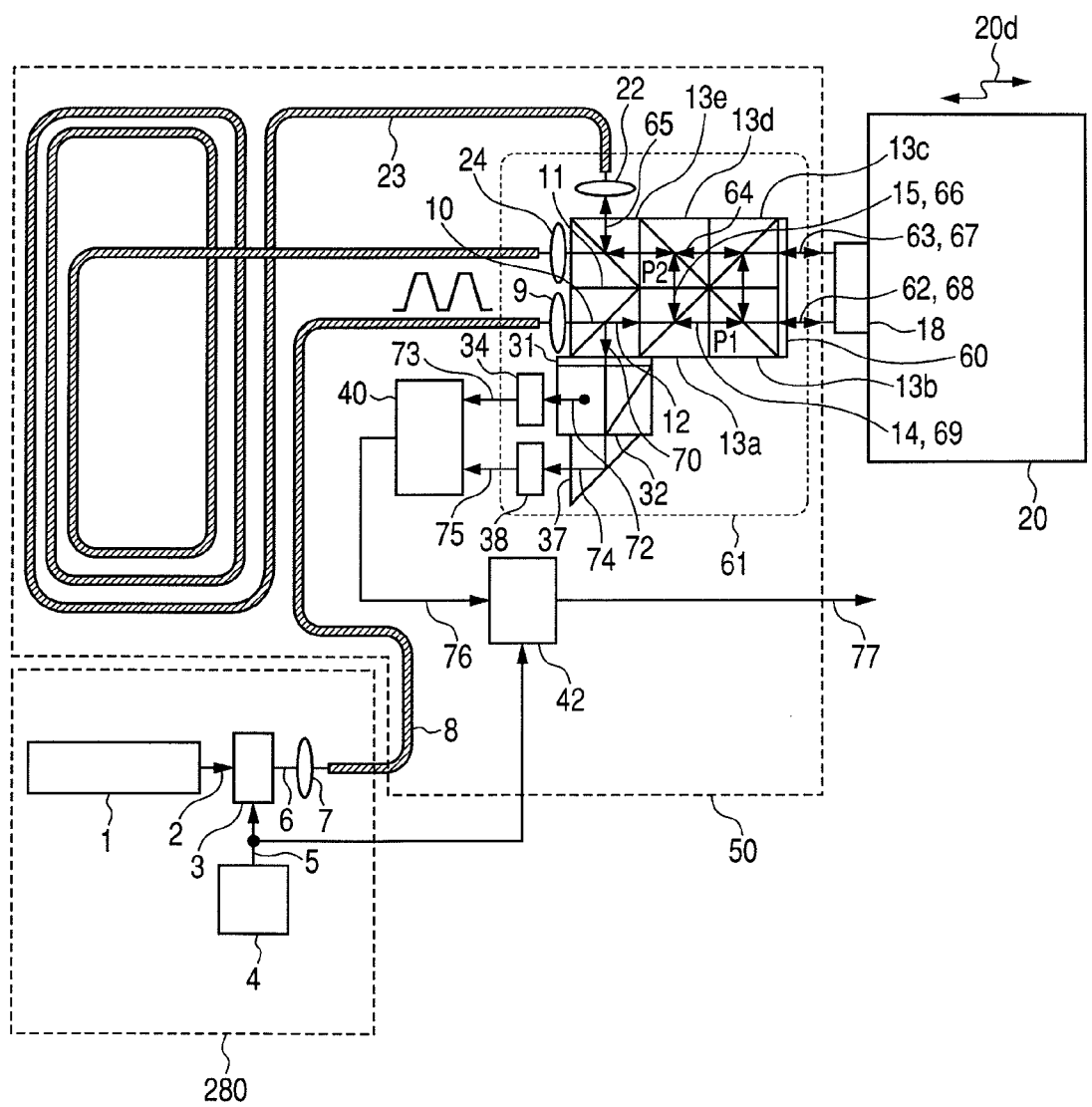
FIG. 4 is a schematic configuration diagram of a second mode of the displacement measurement apparatus of the first embodiment according to the present invention.
Figure 5:
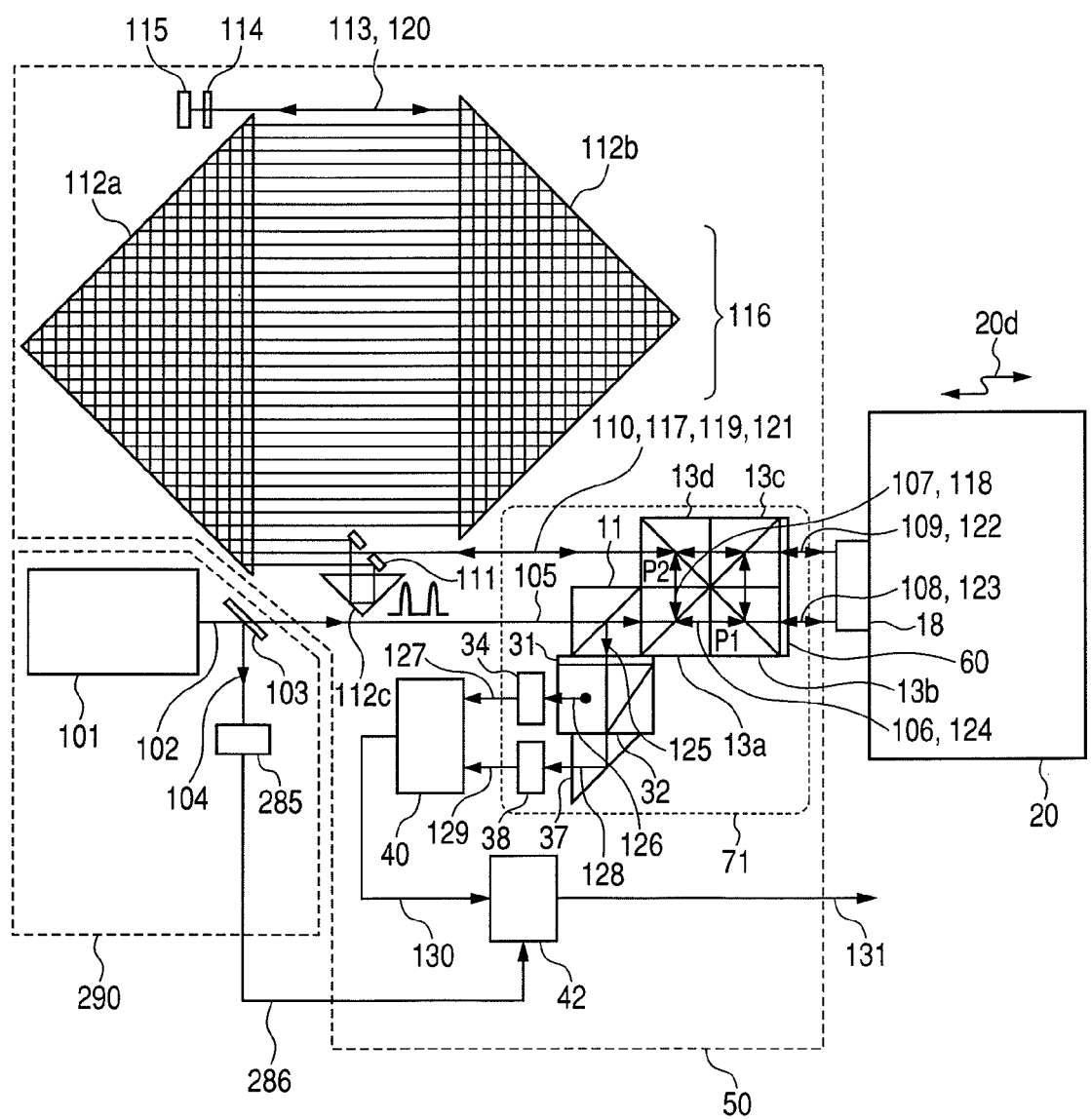
FIG. 5 is a schematic configuration diagram of a third mode of the displacement measurement apparatus of the first embodiment according to the present invention.
Figure 6:
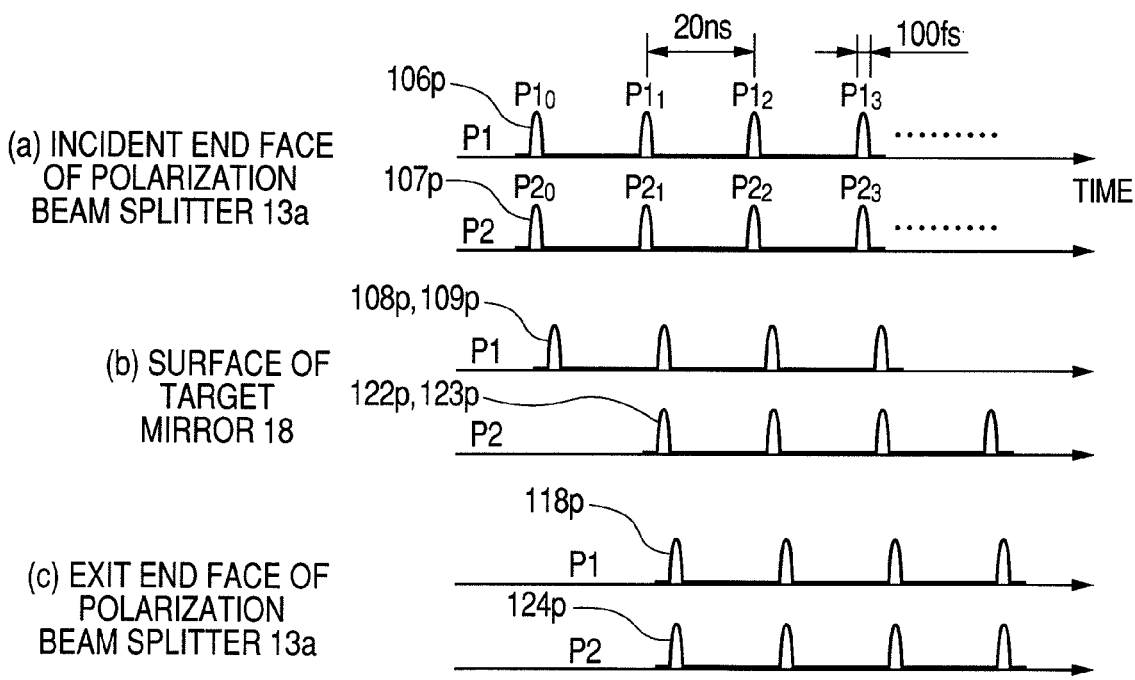
FIG. 6 are schematic diagrams showing relations (on the time axis) of pulse trains of two probe beams in the third mode of the first embodiment according to the present invention.
Figure 7:
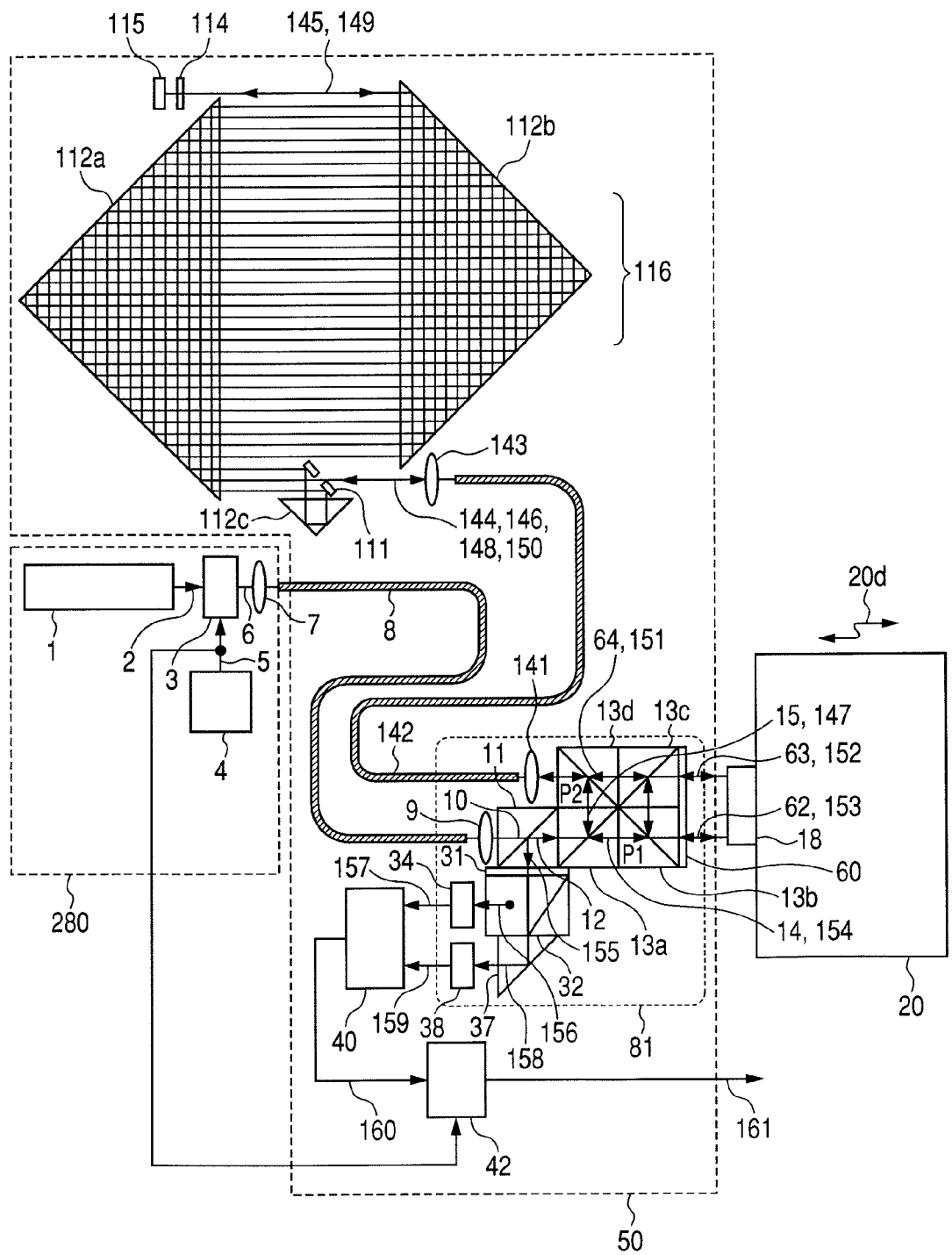
FIG. 7 is a schematic configuration diagram of a fourth mode of the displacement measurement apparatus of the first embodiment according to the present invention.
Figure 8:
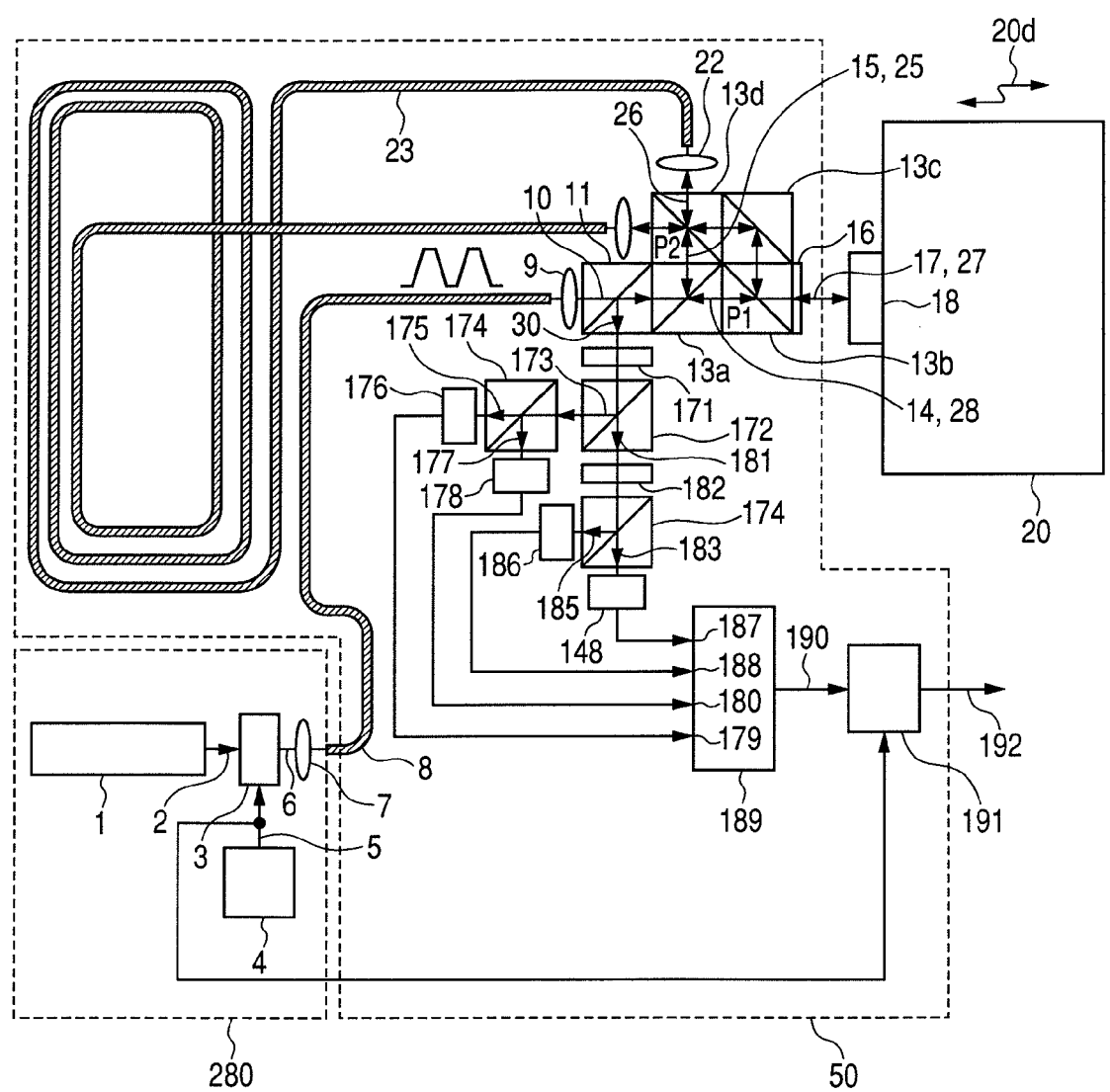
FIG. 8 is a schematic configuration diagram of a fifth mode of the displacement measurement apparatus of the first embodiment according to the present invention.
Figure 9:
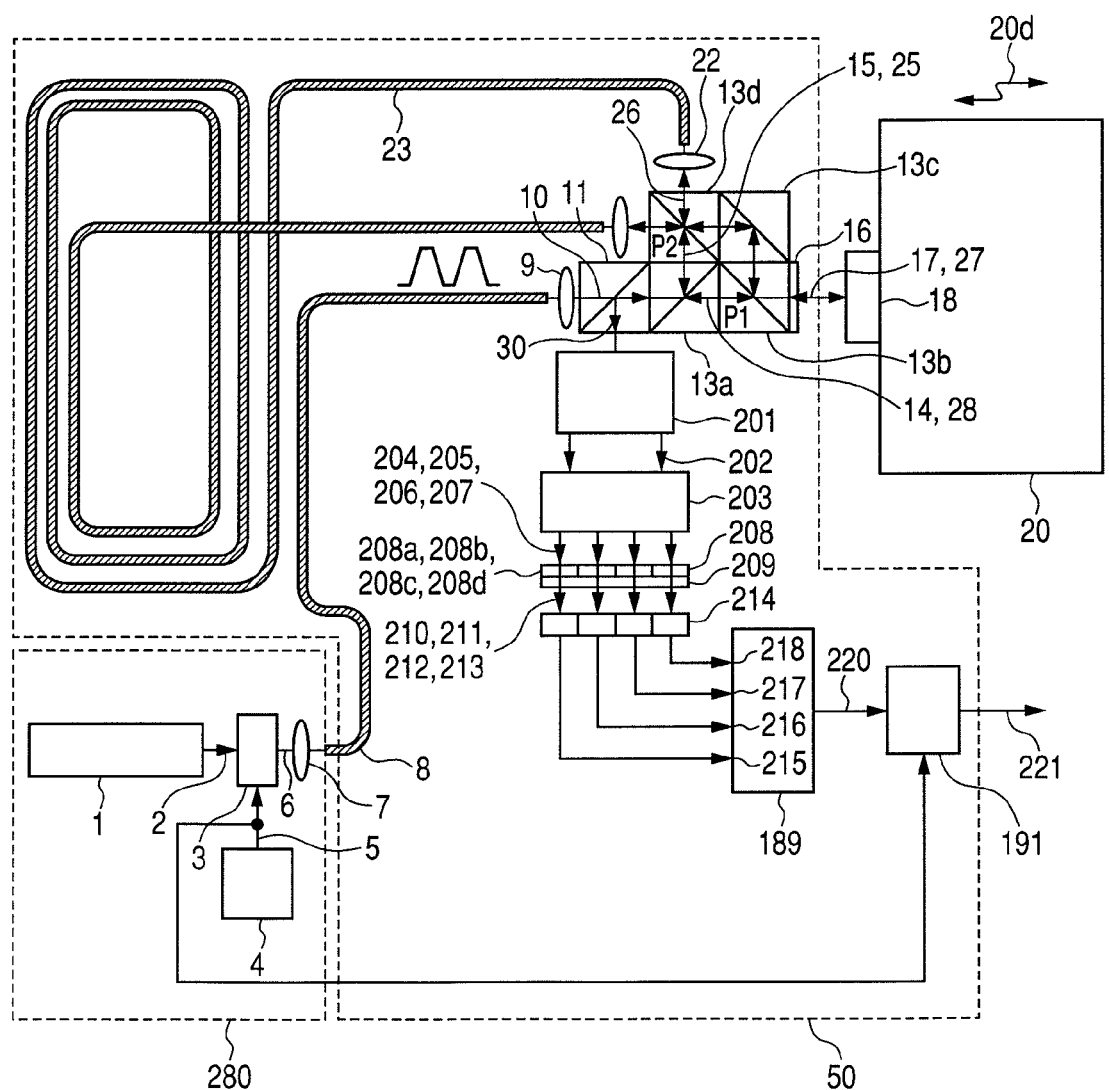
FIG. 9 is a schematic configuration diagram of a sixth mode of the displacement measurement apparatus of the first embodiment according to the present invention.
Figure 10:
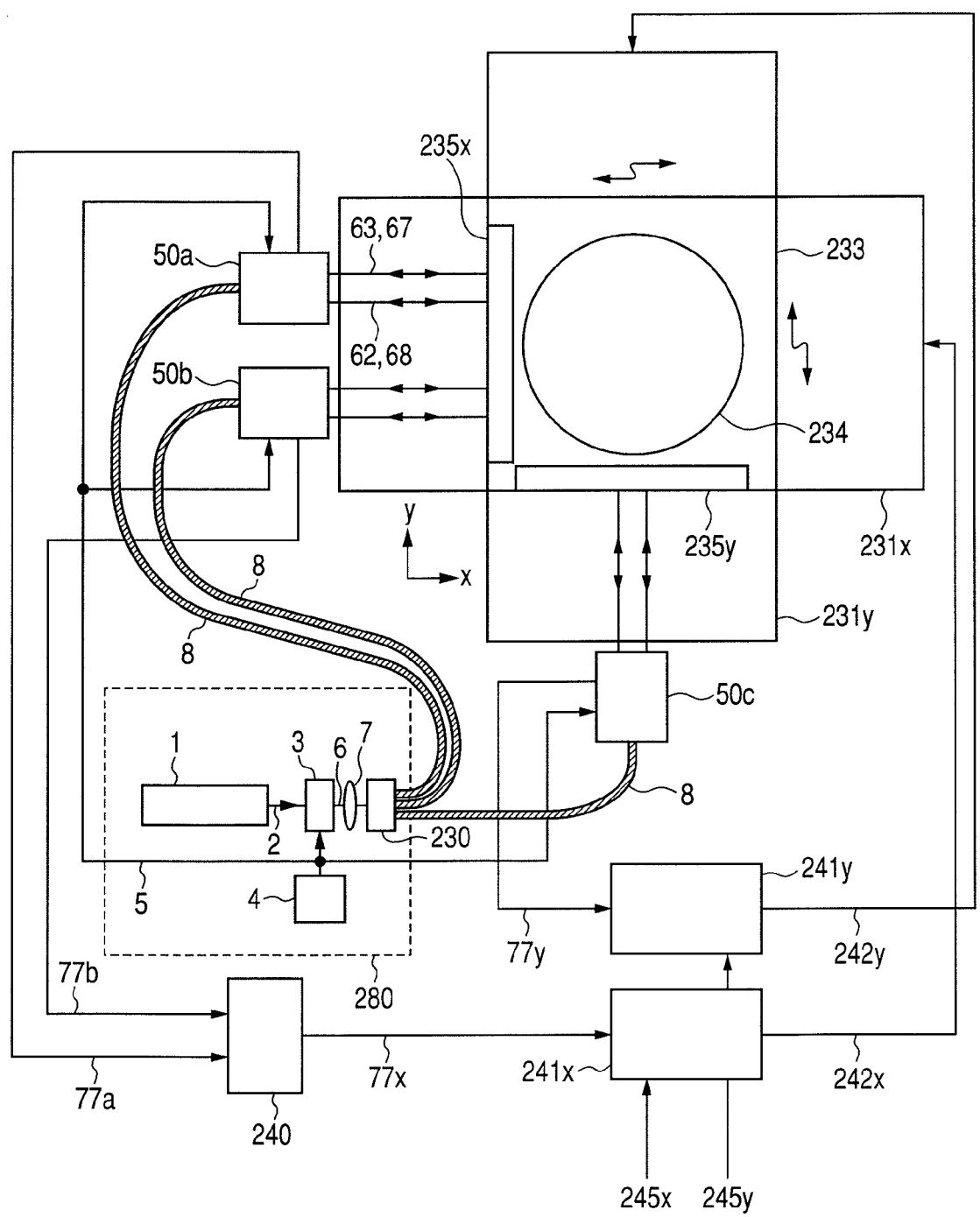
FIG. 10 is a schematic configuration diagram of a second embodiment which applies the first to sixth modes of the displacement measurement apparatus of the first embodiment according to the present invention to positioning control of a stage apparatus.
Figure 11:
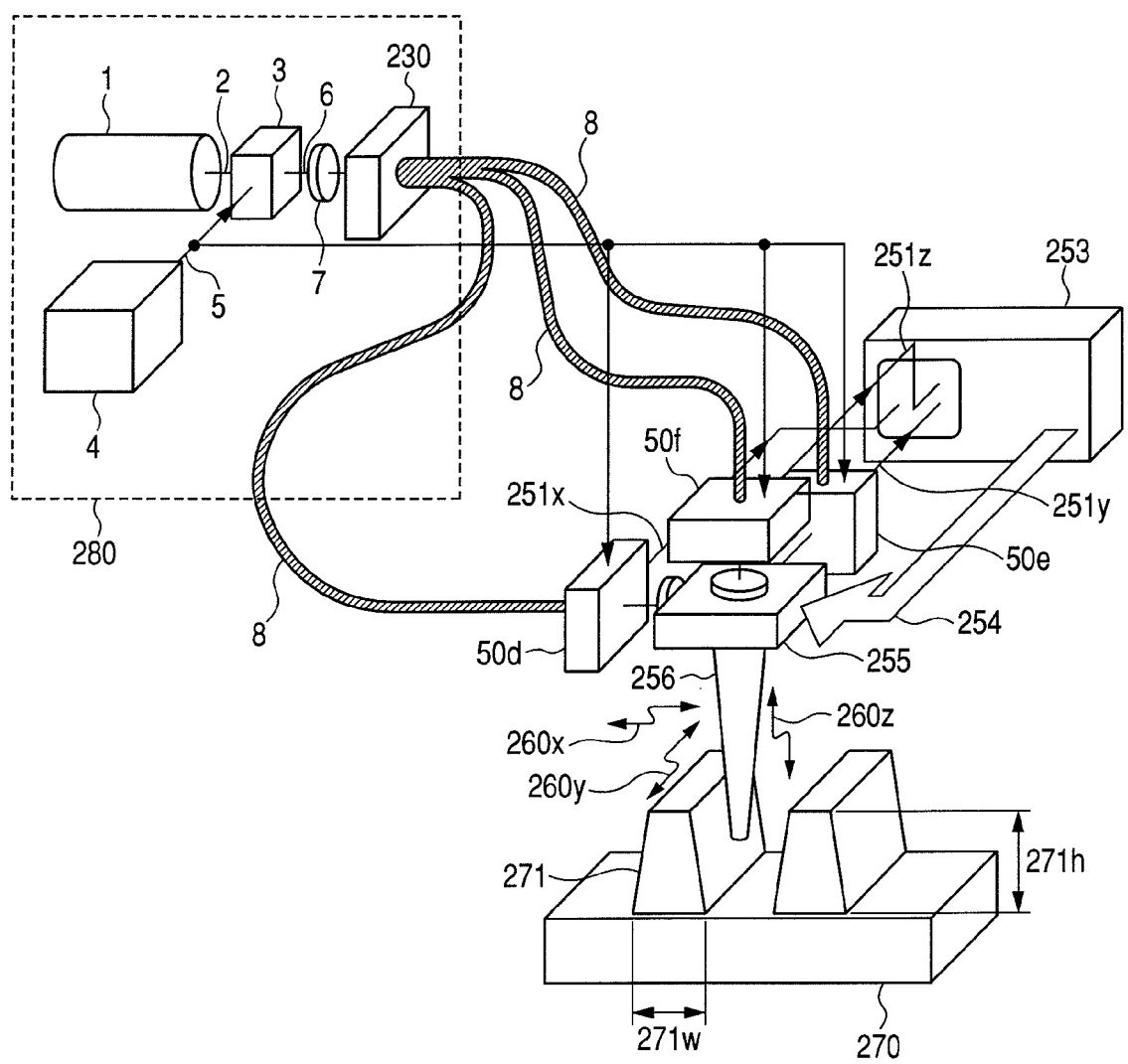
FIG. 11 is a schematic configuration diagram of a third embodiment which applies the first to six modes of the displacement measurement apparatus of the first embodiment according to the present invention to probe positioning control of a probe microscope.
Figure 12:
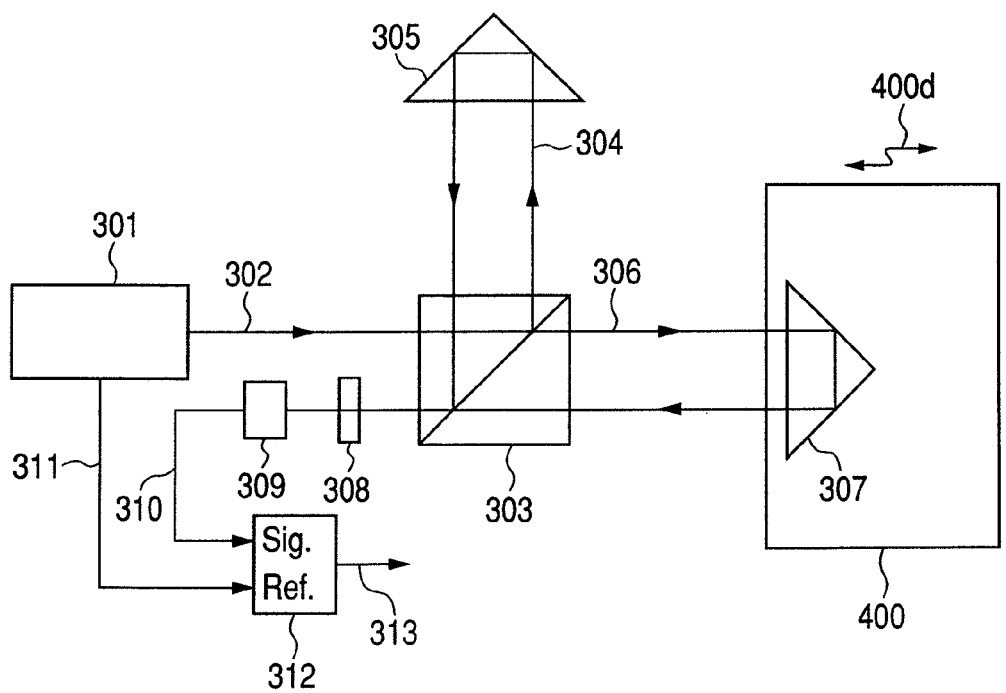
FIG. 12 is a diagram for explaining a conventional displacement measurement apparatus using optical interference.

The invention claimed is:

1. A displacement measurement method comprising the steps of:
   an intensity-modulated beam generation step for generating a beam subjected to intensity modulation at predetermined intervals;
   an optical interference step for splitting a beam generated by the intensity-modulated beam generation step into first and second beams, irradiating a target mirror provided on a movable object under measurement with the split first and second beams after providing a relative time difference therebetween, combining a reflected beam based on the first beam and a reflected beam based on the second beam, the two reflected beams being obtained from the irradiated target mirror, after canceling the relative time difference, and subjecting the two beams to interference based on an optical phase difference in relation to the unit moving distance of the object under measurement produced during the time difference to generate a plurality of interference light signals; and
   a calculation step for calculating the unit moving distance of the object under measurement based on the plurality of interference light signals generated by the optical interference step.

2. A displacement measurement method comprising the steps of:
   an intensity-modulated beam generation step for generating a beam subjected to intensity modulation at predetermined intervals;

an optical interference step for splitting a beam generated by the intensity-modulated beam generation step into first and second beams, irradiating a target mirror provided on a movable object under measurement with the split first and second beams after providing a relative time difference therebetween by sending the second beam through a delay optical path, combining a reflected beam based on the first beam and a reflected beam based on the second beam, the two reflected beams being obtained from the irradiated target mirror, after canceling the relative time difference by sending the reflected beam based on the first beam through the delay optical path, and subjecting the two beams to interference based on an optical phase difference in relation to the unit moving distance of the object under measurement produced during the time difference to generate a plurality of interference light signals; and a calculation step for calculating the unit moving distance of the object under measurement based on the plurality of interference light signals generated by the optical interference step.

3. The displacement measurement method according to claim 1 or 2, wherein:

the optical interference step is configured such that an optical path of the first beam ranging from the splitting to the irradiation of the target mirror coincides with an optical path of a second beam ranging from the reflection by the target mirror to the combination, and an optical path of the first beam ranging from the reflection by the target mirror to the combination coincides with an optical path of the second beam ranging from the splitting to the irradiation of the target mirror.

4. The displacement measurement method according to claim 1 or 2, wherein:

the intensity-modulated beam generation step generates a beam subjected to intensity modulation at predetermined intervals by use of an acousto-optic modulator.

5. The displacement measurement method according to claim 1 or 2, wherein:

the intensity-modulated beam generation step generates a beam subjected to intensity modulation at predetermined intervals by use of pulsed laser.

6. The displacement measurement method according to claim 1 or 2, wherein:

the time difference in the optical interference step coincides with the predetermined interval in the intensity-modulated beam generation step.

7. The displacement measurement method according to claim 1 or 2, wherein:

the calculation step calculates the total distance of the object under measurement by integrating unit moving distances of the object under measurement produced during the time difference.

8. A displacement measurement apparatus comprising:

intensity-modulated beam generation means for generating a beam subjected to intensity modulation at predetermined intervals;

an interference optical system for splitting a beam generated by the intensity-modulated beam generation means into first and second beams, irradiating a target mirror provided on a movable object under measurement with the split first and second beams after providing a relative time difference therebetween, combining a reflected beam based on the first beam and a reflected beam based on the second beam, the two reflected beams being obtained from the irradiated target mirror, after canceling the relative time difference, and subjecting the two beams to interference based on an optical phase difference in relation to the unit moving distance of the object under measurement produced during the time difference to generate a plurality of interference light signals; and calculation means for calculating the unit moving distance of the object under measurement based on the plurality of interference light signals generated by the interference optical system.

9. The displacement measurement apparatus according to claim 8, wherein:

the interference optical system is configured so as to provide an optical path difference between the first and second beams as means for providing a time difference.

10. A displacement measurement apparatus comprising:

intensity-modulated beam generation means for generating a beam subjected to intensity modulation at predetermined intervals;

an interference optical system for splitting a beam generated by the intensity-modulated beam generation means into first and second beams, irradiating a target mirror provided on a movable object under measurement with the split first and second beams after providing a relative time difference therebetween by sending the second beam through a delay optical path, combining a reflected beam based on the first beam and a reflected beam based on the second beam, the two reflected beams being obtained from the irradiated target mirror, after canceling the relative time difference by sending the reflected beam based on the first beam through the delay optical path, and subjecting the two beams to interference based on an optical phase difference in relation to the unit moving distance of the object under measurement produced during the time difference to generate a plurality of interference light signals; and calculation means for calculating the unit moving distance of the object under measurement based on the plurality of interference light signals generated by the interference optical system.

11. The displacement measurement apparatus according to claim 8 or 10, wherein:

the interference optical system is configured such that an optical path of the first beam ranging from the splitting to the irradiation of the target mirror coincides with an optical path of the second beam ranging from the reflection by the target mirror to the combination, and an optical path of the first beam ranging from the reflection by the target mirror to the combination coincides with an optical path of the second beam ranging from the splitting to the irradiation of the target mirror.

12. The displacement measurement apparatus according to claim 8 or 10, wherein:

the intensity-modulated beam generation means generates the intensity-modulated beam by use of an acousto-optic modulator.

13. The displacement measurement apparatus according to claim 8 or 10, wherein:

the intensity-modulated beam generation means generates a beam subjected to intensity modulation at predetermined intervals by use of pulsed laser.

14. The displacement measurement apparatus according to claim 8 or 10, wherein:

the time difference in the interference optical system coincides with the predetermined interval in the intensity-modulated beam generation means.

15. The displacement measurement apparatus according to claim 8 or 10, wherein:
the calculation means calculates the total distance of the object under measurement by integrating unit moving distances of the object under measurement produced during the time difference.

16. A displacement measurement apparatus comprising:
intensity-modulated beam generation means for generating a beam subjected to intensity modulation at predetermined intervals;
an interference optical system for splitting a beam generated by the intensity-modulated beam generation means into first and second beams, irradiating a target mirror provided on a movable object under measurement with the split first and second beams after providing a relative time difference therebetween by sending the second beam through a delay optical path, combining a reflected beam based on the first beam and a reflected beam based on the second beam, the two reflected beams being obtained from the irradiated target mirror, after canceling the relative time difference by sending the reflected beam based on the first beam through the delay optical path, and subjecting the two beams to interference based on an optical phase difference in relation to the unit moving distance of the object under measurement produced during the time difference to generate a plurality of interference light signals; and
calculation means for calculating the unit moving distance of the object under measurement based on the plurality of interference light signals generated by the interference optical system;
wherein the interference optical system is configured such that an optical path of the first beam ranging from the splitting to the irradiation of the target mirror coincides with an optical path of the second beam ranging from the reflection by the target mirror to the combination, and an optical path of the first beam ranging from the reflection by the target mirror to the combination through the delay optical path coincides with an optical path of the second beam ranging from the splitting to the irradiation of the target mirror through the delay optical path.

17. A stage apparatus having the movable object under measurement thereon, wherein:
the stage apparatus includes the displacement measurement apparatus according to any one of claims 8 to 16 and is configured so as to perform scan positioning control of the stage apparatus at least in one axis direction based on the unit moving distance of the object under measurement calculated by the calculation means.

18. A probe microscope having the movable object under measurement thereon and including a probe scanning mechanism for performing scan positioning of a probe at least in one axis direction, wherein:
the probe microscope includes the displacement measurement apparatus according to any one of claims 8 to 16 and is configured so as to perform scan positioning control of the probe scanning mechanism at least in one axis direction based on the unit moving distance of the object under measurement calculated by the calculation means.

* * * * *